(12) United States Patent
Nonaka et al.

(10) Patent No.: US 6,396,280 B1
(45) Date of Patent: May 28, 2002

(54) METHOD AND APPARATUS FOR MEASUREMENT AND AUTOMATIC CONTROL OF ACID CONCENTRATION

(75) Inventors: Toshihiko Nonaka, Chiba; Takeo Kataoka, Ibaraki; Kazuto Esaki, Kashima, all of (JP)

(73) Assignees: Sumitomo Metal Industries, Ltd., Osaka; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/563,861

(22) Filed: May 4, 2000

Related U.S. Application Data

(63) Continuation of application No. PCT/JP98/04994, filed on Nov. 6, 1998.

(30) Foreign Application Priority Data

Nov. 6, 1997 (JP) .............................. 9-304380

(51) Int. Cl.$^7$ ..................... G01V 3/18; G01N 27/416; G01N 27/02
(52) U.S. Cl. ..................... 324/425; 324/629; 324/439; 324/438
(58) Field of Search ................................ 324/629, 425, 324/439, 438; 451/60; 96/4; 73/54.01

(56) References Cited

U.S. PATENT DOCUMENTS

| | | | |
|---|---|---|---|
| 3,657,731 A | * 4/1972 | Krauer et al. | 324/441 |
| 4,956,610 A | * 9/1990 | Galm et al. | 324/425 |
| 5,175,502 A | 12/1992 | Rodabaugh et al. | 324/439 |
| 5,255,427 A | * 10/1993 | Hafner | 29/621.1 |
| 5,483,164 A | * 1/1996 | Moss et al. | 324/425 |
| 5,664,990 A | * 9/1997 | Adams et al. | 451/60 |
| 5,693,880 A | * 12/1997 | Maginnis, Jr. | 73/202.5 |
| 6,034,520 A | * 3/2000 | Sugihara et al. | 324/71.1 |

FOREIGN PATENT DOCUMENTS

| | | |
|---|---|---|
| JP | 55-36073 | 9/1980 |
| JP | 57-2275 | 1/1982 |
| JP | 58-147569 | 9/1983 |
| JP | 59-20750 | 5/1984 |
| JP | 5-195268 | 8/1993 |
| JP | 6-126322 | 5/1994 |
| JP | 6-248479 | 9/1994 |
| JP | 7-54175 | 2/1995 |
| JP | 9-125270 | 5/1997 |
| JP | 10-147895 | 6/1998 |

OTHER PUBLICATIONS

International Search Report issued in International Application No. PCT/JP98/04994 Apr. 6, 1999.

* cited by examiner

*Primary Examiner*—N. Le
*Assistant Examiner*—Wasseem H. Hamdan
(74) *Attorney, Agent, or Firm*—Burns, Doane, Swecker & Mathis, LLP

(57) ABSTRACT

An acid concentration continuous measuring apparatus is equipped with the combination of a body having a flow path through which pickling solution contained in a pickling tank is made to continuously pass in a single direction, a density sensor, a temperature sensor, and a conductivity sensor which are installed on the body and substantially continuously measure the pickling solution flowing along the flow path, and a calculating apparatus which calculates the acid concentration of the pickling solution based on the measured results. Feedback control of the hydrochloric acid concentration in a final pickling tank of a plurality of pickling tanks forming a continuous pickling line is performed using the acid concentration continuous measuring apparatus.

21 Claims, 10 Drawing Sheets

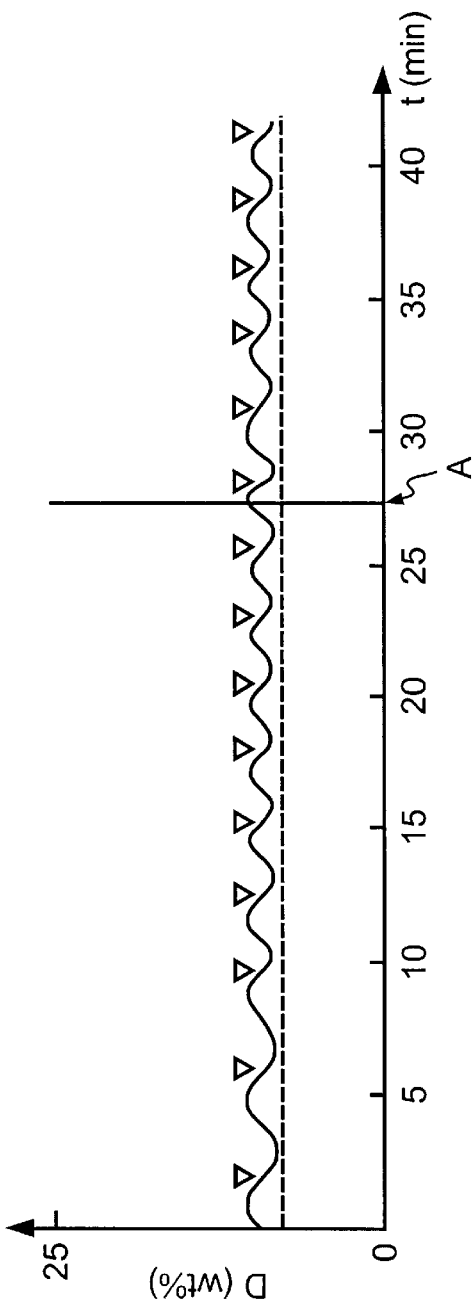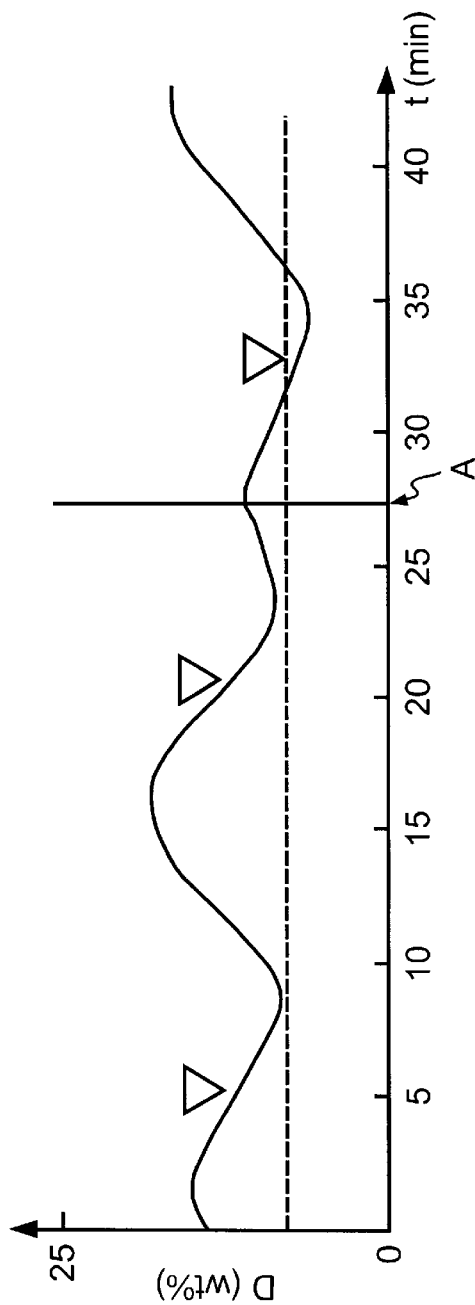

METHOD AND APPARATUS FOR MEASUREMENT AND AUTOMATIC CONTROL OF ACID CONCENTRATION

This application is a continuation application in the U.S.A of PCT/JP98/04994, filed Nov. 6, 1998 in Japan.

TECHNICAL FIELD

This invention relates to an acid concentration measuring apparatus and an acid concentration measuring method which can measure for a sufficiently short period of time and accordingly at sufficient short measurement intervals the acid concentration of a pickling solution contained in a pickling tank of a continuous pickling line for steel stock, etc. It also relates to an acid concentration automatic control apparatus which, using the acid concentration measuring apparatus, can automatically control the acid concentration of a pickling solution contained in a pickling tank, such as an acid concentration automatic control apparatus and an acid concentration automatic control method which are suitable for use with a continuous pickling line of the type in which pickling solution contained in a pickling tank on a downstream side is made to successively overflow to adjoining pickling tanks on an upstream side.

TECHNICAL BACKGROUND

Pickling is a treatment process in which an oxide scale present on the surface of steel plates, such as cold rolled steel plates, hot rolled steel plates to be subjected to cold rolling, hot rolled steel plates which are in the form of final products, is removed by immersing the steel plates in a pickling solution of hydrochloric acid, sulfuric acid, etc., or by spraying a pickling solution at the surface of the steel plates. Pickling is performed, for example, by continuously passing steel plates through a continuous pickling line in which a plurality of pickling tanks containing a pickling solution are arranged in series in the direction of movement of the plates. In pickling performed using such a continuous pickling line, the acid concentration in each pickling tank, and particularly in the last pickling tank, greatly influences the efficiency of removal of oxide scale. Therefore, in pickling using such a continuous pickling line, it is necessary to accurately control the acid concentration.

In the past, in a continuous pickling line for steel strip, acid concentration measuring of pickling solution contained in a pickling tank and the supply of acid solution were performed by measuring the acid concentration of pickling solution contained in a pickling tank using a table-top measuring device and manually supplying acid solution to the pickling tank based on the results of measuring, or by installing the table-top measuring device on a pickling tank of the continuous pickling line to automatically measure acid concentration and automatically control the amount of acid solution supplied to the pickling tank based on the results of measuring.

However, when acid solution is manually supplied to a pickling tank, it is not possible to accurately cope with changes in the concentration of the pickling solution in the pickling tank. Therefore, it is easy for fluctuations in the concentration of the pickling solution to become large, and it is easy for the amount of acid solution which is supplied to become too great when trying to stay on the safe side. Therefore, the consumption of the pickling solution per unit of output tends to become poor when acid solution is manually supplied to a pickling tank.

A titration-type analyzer is used when automatically measuring the acid concentration of pickling solution in a pickling tank with a table-top measuring apparatus installed on the pickling tank. Measuring using a titration-type analyzer is performed by successively introducing a sample liquid, a reagent, and a pickling solution into a measuring cell. Therefore, the sample liquid flows intermittently into the measuring cell, so the retained sample liquid solidifies in piping and clogs up the piping, and measuring becomes impossible a short time after it is begun.

In addition, when performing measuring using a titration-type analyzer, only a minute quantity of sample liquid is supplied, so fine tubes within the piping system become clogged. If a filtering apparatus is provided to prevent clogging, a complicated piping system having a switching mechanism becomes necessary. An increase in the number of times the switching mechanism is switched leads to clogging of the piping.

In addition, a titration-type analyzer is expensive. Therefore, when a plurality of types of sample liquid are present, the sampling pipes much be connected in parallel to a single titration-type analyzer, and measuring is carried out by switching each sampling pipe. The switching of the sample pipes also causes clogging of the pipes to become frequent.

Furthermore, when measuring with a titration-type analyzer, approximately 15 minutes are required for one sampling from the introduction of the sample liquid until the output of data. Therefore, when sampling is carried out more than once using the same titration-type analyzer, the interval between data outputs is considerable, i.e., a minimum of 15 minutes. As a result, even if a titration-type analyzer is applied to an acid concentration control system for a continuous pickling line, it is actually impossible to output the measured acid concentration of the pickling solution at sufficiently short measurement intervals.

Thus, measurement of acid concentration using a titration-type analyzer has a long reaction time for chemicals, a long switching time by a pretreatment apparatus at the time of cleaning, and a long sampling time. Therefore, a time lag between sampling and measuring is unavoidable. Furthermore, when measuring acid concentration using a titration-type analyzer, data is output intermittently at considerable intervals. Thus, the responsiveness of control is extremely poor. Accordingly, it was difficult to control the acid concentration of a pickling solution using a titration-type analyzer with high accuracy.

In this manner, measuring the acid concentration of a pickling solution in a pickling tank requires much time. Therefore, particularly in a continuous pickling line of the type in which the pickling tanks are separated by partitions and pickling solution in a pickling tank on a downstream side successively overflows to pickling tanks on an upstream side and acid solution is supplied to the final pickling tank, normally the acid concentration of only the final pickling tank is measured to determine the amount of acid solution to be supplied, whereby the supply of acid solution is controlled in accordance with the acid concentration of the pickling solution in the final pickling tank.

However, in this type of continuous pickling line, reaction between the pickling solution and the scale layer on steel strip is actually more vigorous in more upstream pickling tanks than in the final pickling tank. Therefore, when fluctuation in the acid concentration of the pickling solution is grater in the upstream pickling tanks than in the final pickling tank, scale may remain on the steel strip.

If scale remains on steel strip, it becomes necessary to stabilize the acid concentration of the pickling solution in each pickling tank by lowering the line speed. In addition, in order to prevent scale from remaining, it is necessary to control the acid concentration of pickling solution in each pickling tank more rigorously than normally. Therefore, even if it is possible to measure the acid concentration and control the supply of acid solution in real time, increases in acid consumption per unit of output, i.e., in cost are unavoidable.

Therefore, in the past, various proposals have been made of ways to speedily control the acid concentration of a pickling solution with high responsiveness to compensate for the fact that the acid concentration of pickling solution in a pickling tank could not be measured as it continuously flowed.

For example, Japanese Published Examined Patent Application Sho 57-2275 discloses an invention in which, because of the fact that in feedback control of the acid concentration of pickling solution, hatching takes place if the gain is made large while the accuracy of a sensor decreases if the gain is made small and the sensor can't be used, instead of feedback control, feed-forward control is carried out using a formula relating liquid temperature, acid concentration, acid reaction time, and the reactive surface area to improve the responsiveness of control of the acid concentration of a pickling solution.

Japanese Published Unexamined Patent Application Hei 6-126322 discloses an invention for use in a spray-type pickling line in which the acid concentration of the pickling solution in a most upstream circulation tank is adjusted and acid solution in an amount corresponding to the amount of acid charged at that time is supplied to a circulation tank just downstream thereof, and this adjustment of acid concentration and supply of acid is successively carried out with respect to downstream circulation tanks, whereby the acid concentration of the pickling solution in each circulation tank is controlled.

Japanese Published Unexamined Patent Application Hei 9-125270 discloses an invention in which a circulation tank is connected to a pickling tank by piping and pickling solution is circulated. Pickling solution is removed from a portion of the piping, and the acid concentration of the removed pickling solution is continuously measured using an acid concentration analyzer. Furthermore, the surface level of pickling solution in a circulation tank is measured, and when the measured value deviates from a target value, discharge of acid, addition of acid, or addition of water is carried out.

Japanese Published Unexamined Patent Application Hei 10-147895 discloses a method for controlling the acid concentration of pickling solution in a pickling tank in a continuous pickling line of the type having a separate circulation apparatus for pickling solution provided for each pickling tank, with no overflow of pickling solution between adjoining pickling tanks.

Japanese Published Unexamined Patent Application Hei 7-54175 discloses a method in which the weight loss due to pickling is determined from the difference in the plate thickness of a steel plate between before and after pickling in a continuous pickling line, and the supply of acid and the acid concentration are controlled based on the thus determined weight loss due to pickling.

However, in the invention disclosed in Japanese Published Examined Patent Application Sho 57-2275, the required measuring of acid concentration is not performed while the pickling solution is continuously flowing. Therefore, in that invention, it is not possible to control the acid concentration with high accuracy. Furthermore, when carrying out that invention, if acid concentration is measured over a long period of time, sampling piping becomes clogged due to acid, leading to a decrease in the operating efficiency of the measuring device.

When continuously controlling acid concentration by the invention disclosed in Japanese Published Unexamined Patent Application Hei 6-126322, it is necessary to measure the acid concentration of the pickling solution in a final circulation tank at sufficiently short measurement intervals. However, as previously stated, it is impossible to measure the acid concentration of pickling solution at sufficiently short measurement intervals. Therefore, that invention cannot control the acid concentration of a pickling solution with high accuracy either.

The acid concentration analyzer used in the invention disclosed in Japanese Published Unexamined Patent Application Hei 9-125270 is installed through a valve on a branch pipe which branches from a return pipe for pickling solution. Therefore, it can be seen that this acid concentration analyzer is of the same type as the above-described titration-type analyzer. Thus, in that invention as well, it is not possible to measure the acid concentration of pickling solution at sufficiently short measurement intervals. As a result, in that invention as well, it is difficult to control the acid concentration of pickling solution with high accuracy. Furthermore, in that invention, when water is added, the acid concentration of waste acid decreases, so the acid consumption per unit of output at the time of recovery of waste acid becomes poor.

In the continuous pickling line disclosed in Japanese Published Unexamined Patent Application Hei 10-147895, it is possible to independently control the acid concentration of the pickling solution in each pickling tank, so it is possible to control the acid concentration of pickling solution with high accuracy. However, control according to that proposal cannot be applied without any equipment modification to a continuous pickling line of the type in which pickling solution overflows between adjoining pickling tanks. Namely, in order to apply the method disclosed in Japanese Published Unexamined Patent Application Hei 10-147895 to a continuous pickling line in which pickling solution is made to overflow between adjoining pickling tanks, it is necessary to install a circulation tank for acid solution, a circulation pump, piping for waste acid and for the supply of acid, etc., for each pickling tank. Therefore, considerable investment in equipment and installation space are required, so it is actually quite difficult to canny out that invention.

Furthermore, scale loss during pickling varies with the scale thickness, which varies depending, for example, on the winding temperature during hot rolling. Therefore, in the invention disclosed in Japanese Published Unexamined Patent Application Hei 7-54175, the weight loss during pickling and the change in the acid concentration of the pickling solution are not necessarily equal to each other. For this reason, the accuracy of control of the acid concentration of a pickling solution is decreased to the extent that a deviation develops between the change in the acid concentration of the pickling solution and the weight loss due to pickling.

Thus, all of the methods of the prior art have the fatal problem—that the acid concentration of pickling solution contained in pickling tanks cannot be measured at sufficiently short measurement intervals. Therefore, not only when the control of the supply of acid solution is performed manually but also when it is performed automatically, it was necessary to put up with response lags and a decrease in accuracy in the control of the acid concentration of pickling solution.

U.S. Pat. No. 5,175,502 proposes an invention in which pickling solution removed from a pickling tank is diluted with water to prevent clogging by the pickling solution, and the acid concentration of the pickling solution is measured based on the density, the conductivity, and the temperature of the diluted pickling solution. However, in that invention, pickling solution is diluted with water, so the pickling solution ends up being waste liquid after measuring. For this reason, costs end up increasing with that invention.

DISCLOSURE OF THE INVENTION

The object of the present invention is to provide an acid concentration measuring apparatus and an acid concentration measuring method which can measure the acid concentration of pickling solution in a pickling tank at sufficiently short measurement intervals, as well as an acid concentration automatic control apparatus and an acid concentration automatic control method which use the acid concentration measuring apparatus to automatically control the acid concentration of pickling solution supplied to each of the pickling tanks making up a continuous pickling line with sufficiently short measurement intervals and with high accuracy.

Specifically, the object of the present invention is to provide an acid concentration measuring apparatus and an acid concentration measuring method which, by performing continuous measuring of a sample of a pickling solution in a pickling tank at sufficiently short measurement intervals, can shorten the periods of time in which measuring is not taking place and can substantially continuously and accurately measure variations and segregation in the acid concentration of the pickling solution and which has a simple sampling method for pickling solution and is excellent with respect to ease of maintenance, as well as an acid concentration automatic control apparatus and an acid concentration automatic control method which, using this acid concentration measuring apparatus, can automatically control the acid concentration of pickling solution in each pickling tank making up a continuous pickling line substantially continuously and with high accuracy.

More particularly, the object of the present invention is to provide an acid concentration automatic control apparatus and an acid concentration automatic control method which, using the above-described acid concentration measuring apparatus, measures at sufficiently short measurement intervals the acid concentration of pickling solution in a pickling tank in a continuous pickling line of the type in which pickling solution in a pickling tank on a downstream side is made to successively overflow to adjoining pickling tanks on an upstream side and the results of measuring are fed back to the supplied amount of acid solution, whereby the acid concentration of the pickling solution in each pickling tank can be maintained at a proper level and the consumption of pickling solution per unit of output can be improved.

The present inventors performed various investigations aimed at accomplishing these objectives. They fixed their attention on causing pickling solution in pickling tanks to continuously flow and to measuring the acid concentration of the pickling solution as it is continuously flowing. In the past, even if pickling solution was made to continuously flow in this manner, regions where the flow speed decreased always developed, and it was thought that the pickling solution would clog up in a short length of time in the regions of decreased flow speed. Therefore, up to the present time, the measuring of the acid concentration of pickling solution as it is continuously flowing was not investigated.

As a result, the present inventors found that by installing a measuring device which continuously measures a physical property other than the acid concentration of continuously flowing pickling solution in a flow path of the pickling solution and by performing calculations based on the measured data output by the measuring device, clogging by the pickling solution can be virtually eliminated, and the acid concentration of pickling solution in the pickling tanks can be determined substantially continuously as well as accurately at sufficiently short measurement intervals.

The present inventors also found that by performing feedback control or feedback control and feed forward control of the acid concentration of pickling solution in a pickling tank to which acid solution is supplied based on the calculated acid concentration obtained in the above manner, it is possible to rapidly and precisely cope with constant variations in acid concentration and to control with high accuracy the acid concentration of pickling solution in a pickling tank.

The present inventors additionally found that by performing feedback control of the acid concentration of pickling solution in a pickling tank to which acid solution is supplied based on the calculated acid concentration in a pickling tank to which acid solution is supplied and in at least one pickling tank other than a pickling tank to which acid solution is supplied, it is possible to control with high accuracy the acid concentration of pickling solution in a pickling tank, even in a continuous pickling line of the type in which pickling solution in a pickling tank on a downstream side is made to successively overflow to adjoining pickling tanks on an upstream side.

Based on these findings, the present inventors performed further investigations and completed the present invention.

The gist of the present invention is an acid concentration measuring apparatus characterized by being equipped with the combination of a body which is installed on a portion of a flow path of pickling solution which is taken from a pickling tank, the flow path being connected to the pickling tank, a density sensor which measures the density of the pickling solution flowing within the body, a temperature sensor which measures the temperature of the pickling solution in the flow path or the pickling tank, a conductivity sensor which measures the conductivity of the pickling solution in the flow path or the pickling tank, and a calculating apparatus which calculates the acid concentration of the pickling solution flowing through the portion of the flow path based on the measurements by the density sensor, the temperature sensor, and the conductivity sensor. This will be referred to below as "the first invention".

In the above-described first invention, one or both of the temperature sensor and the conductivity sensor is preferably installed on the body.

In the acid concentration measuring apparatus according to the first invention, the density sensor is preferably a differential pressure type density sensor having at least two sensing portions. In this case, the two sensing portions are preferably installed at least 500 mm apart in the direction in which a flow path is formed in the body in order to maintain a desired measurement accuracy.

Also, in the acid concentration measuring apparatus according to the first invention, the temperature sensor and the conductivity sensor are preferably both installed on the exit side of the flow path in the body in order to maintain a desired measuring accuracy.

Furthermore, in the acid concentration measuring apparatus according to the first invention, the flow path within the body is preferably made as straight as possible so as not to form local regions where the flow speed decreases, and in regions of the flow path in which the flow speed decreases and it is easy for pickling solution to clog, a clogging prevention mechanism which suppresses the lingering of pickling solution is preferably installed in order to prevent clogging by the pickling solution.

From another standpoint, the present invention is an acid concentration measuring method characterized by measuring the density of pickling solution continuously flowing within the interior of an acid concentration measuring apparatus body which is installed in a portion of a flow path of pickling solution taken from a pickling tank, the flow path being connected to the pickling tank, measuring the temperature and the conductivity of the pickling solution in the flow path or the pickling tank, and calculating the acid concentration of the pickling solution flowing in the portion of the flow path based on the results of measurement of the density, the temperature, and the conductivity. This will be referred to below as "the second invention".

From another standpoint, the present invention is an acid concentration automatic control apparatus characterized by being equipped with the combination of the acid concentration measuring apparatus according to the first invention which is installed on the pickling tank to which acid solution is supplied out of a plurality of pickling tanks forming a continuous pickling line, and a feedback control means which adjusts the acid concentration of pickling solution in the pickling tank to which acid solution is supplied based on the calculated value of acid concentration obtained by the acid concentration measuring apparatus. This will be referred to below as "the third invention".

From another standpoint, the present invention is an acid concentration automatic control apparatus characterized by being equipped with the combination of the acid concentration measuring apparatus according to the first invention which is installed on a pickling tank to which acid solution is supplied and on at least one pickling tank other than a pickling tank to which acid solution is supplied of a plurality of pickling tanks forming a continuous pickling line, and a feedback control means which adjusts the acid concentration of pickling solution in a pickling tank to which acid solution is supplied based on the calculated value of acid concentration obtained from each of a plurality of acid concentration measuring apparatuses. This will be referred to below as "the fourth invention".

In the acid concentration automatic control apparatus according to the third invention or the fourth invention, a feed forward control means is preferably provided to adjust the acid concentration of pickling solution in a pickling tank to which acid solution is supplied based on the calculated value of acid concentration obtained from the acid concentration measuring apparatus in order to further increase the responsiveness of control. This will be referred to below as "the fifth invention".

The pickling tanks which are the objects being controlled by the acid concentration measuring apparatus, the acid concentration automatic control measuring method, or the acid concentration automatic control apparatus according to the first through fifth inventions are not limited to being immersion types but may instead be spray types.

In the acid concentration automatic control apparatuses according to the third through fifth inventions, the pickling tank to which acid solution is supplied is shown, by way of example, as being the final pickling tank.

Furthermore, the continuous pickling line to which the acid concentration automatic control apparatus according to the third through fifth inventions is applied is illustrated, by way of example, as a continuous pickling line of the type in which pickling solution in a pickling tank on a downstream side is made to successively overflow to adjoining pickling tanks on an upstream side.

From another standpoint, the present invention is an acid concentration automatic control method characterized in that an acid concentration measuring apparatus according to the first invention is installed at least on a pickling tank to which acid solution is supplied out of a plurality of pickling tanks forming a continuous pickling line, and based on a calculated value of acid concentration obtained from this acid concentration measuring apparatus, feedback control or a combination of feedback control and feed forward control is carried out to adjust the acid concentration of pickling solution in the pickling tank to which acid solution is supplied. This will be referred to below as "the sixth invention".

According to the acid concentration measuring apparatus of the first invention or the acid concentration measuring method of the second invention, the density, the temperature, and the conductivity of a pickling solution can be measured at sufficiently short measurement intervals, so the acid concentration of pickling solution can be measured over a long period substantially continuously at sufficiently short measurement intervals. Furthermore, a construction is employed such that pickling solution does not clog in flow passages within which pickling solution is flowing, so the ease of maintenance is improved. Accordingly, an acid concentration measuring apparatus according to the present invention makes it possible to perform measurements over long periods.

According to the acid concentration automatic control apparatus of the third through fifth inventions or the acid concentration automatic control method of the sixth invention employing this acid concentration measuring apparatus, the acid concentration of pickling solution in a pickling tank to which acid is supplied can be controlled with high accuracy and stability. As a result, acid consumption per unit of output is improved.

In particular, according to the acid concentration automatic control apparatus of the fifth invention, a combination of continuous measuring of acid concentration using the acid concentration measuring apparatus according to the first invention is combined with feedback control of the acid concentration, and on this foundation is superimposed feed forward control of acid concentration. Therefore, according to the acid concentration automatic control apparatus of the fifth invention, the accuracy and responsiveness of control of the acid concentration of pickling solution in a pickling tank can both be enormously improved.

Furthermore, in the acid concentration automatic control apparatus according to the third through fifth inventions, using the acid concentration measuring apparatus according to the first invention, the acid concentration of pickling solution in each of the pickling tanks in a continuous pickling line of the type in which pickling solution in a pickling tank on a downstream side is made to successively overflow to adjoining pickling tanks on an upstream side is measured at sufficiently short measurement intervals, and the measured result is fed back to the amount of acid solution which is supplied. Therefore, the acid concentration of the pickling solution in each pickling tank can be maintained at an appropriate level, and the consumption of pickling solution per unit of output can be decreased.

BRIEF DESCRIPTION OF THE DRAWINGS

FIGS. 10(a) and 10(b) are graphs showing the variation in the acid concentration D in a final pickling tank over time for an example of the present invention and for conventional example, respectively.

Figure 1:
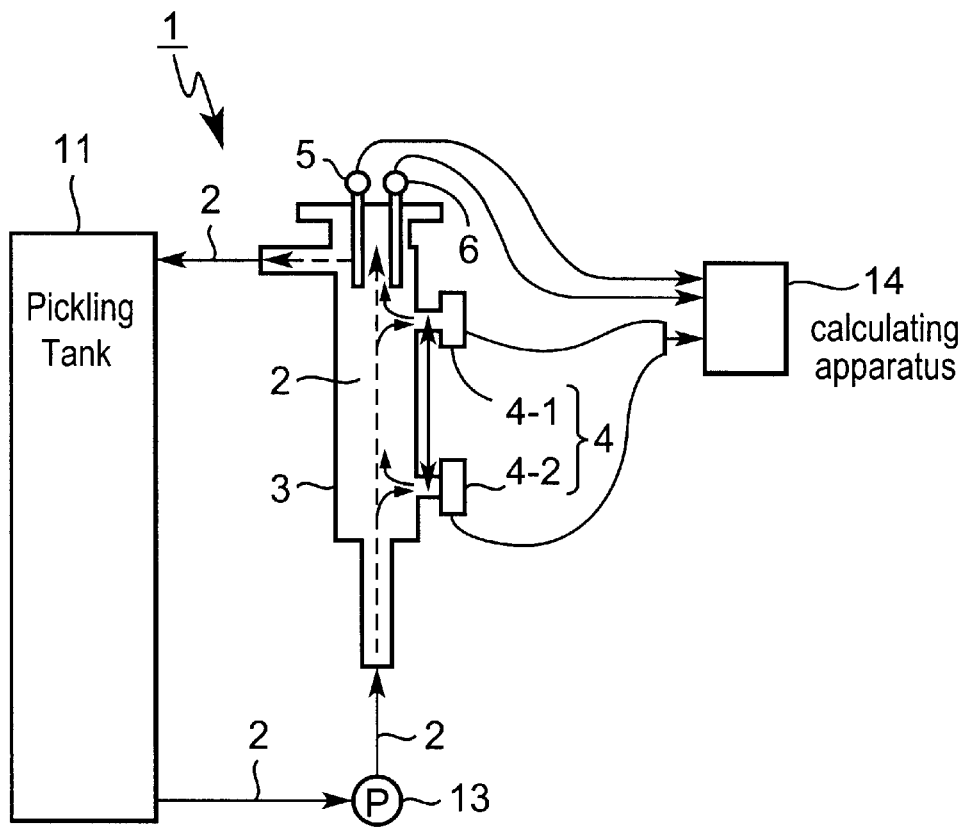
FIG. 1 is an explanatory view of the internal structure of an acid concentration continuous measuring apparatus of a first mode of carrying out the invention.

In the figures, reference numeral 1 indicates an acid concentration continuous measuring apparatus, reference numeral 2 indicates a circulation flow path, reference numeral 3 indicates an acid concentration continuous measuring apparatus body, reference numeral 4 indicates a density sensor, reference numerals 4-1 and 4-2 indicate sensing portions, reference numeral 5 indicates a temperature sensor, reference numeral 6 indicates a conductivity sensor, reference numeral 11 indicates a pickling tank, reference numeral 13 indicates a pump, and reference numeral 14 indicates a calculating apparatus.

DETAILED DESCRIPTION OF THE INVENTION

First Mode of Carrying Out the Invention

Next, a first mode of carrying out an acid concentration measuring apparatus, an acid concentration measuring method, an acid concentration automatic control apparatus, and an acid concentration automatic control method according to the first through third, the fifth, and the sixth inventions will be described in detail using as an example the case in which hydrochloric acid is used as a pickling solution and acid solution is supplied to a final pickling tank. In the following description, an example will be given of the case in which the acid concentration measuring apparatus and the acid concentration measuring method of the first through third inventions are respectively an acid concentration continuous measuring apparatus and an acid concentration continuous measuring method which substantially continuously measure acid concentration.

Acid Concentration Continuous Measuring Apparatus

Figure 2:
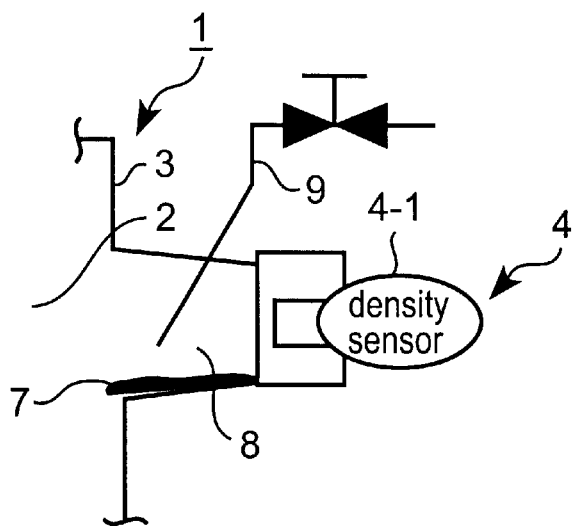
FIG. 2 is an enlarged cross-sectional view of the vicinity of the region where a density sensor is installed.

First, this mode of carrying out an acid concentration continuous measuring apparatus according to the first invention will be described. FIG. 1 is an explanatory view of the internal structure of an acid concentration continuous measuring apparatus of this mode for carrying out the invention. In FIG. 1, the dashed line arrows show the flow of pickling solution. FIG. 2 is a cross-sectional view showing the vicinity of the installation portion of the density sensor 4.

As shown in FIG. 1, this acid concentration continuous measuring apparatus 1 is equipped with a cylindrical acid concentration continuous measuring apparatus body 3 housing a portion of a circulation flow path 2 through which pickling solution pumped from a pickling tank 11 by a pump 13 continuously flows in one direction, and a density sensor 4, a temperature sensor 5, and a conductivity sensor 6 which substantially continuously measure pickling solution flowing within the acid concentration continuous measuring apparatus body 3 which is a part of the circulation path 2.

The acid concentration continuous measuring apparatus body 3 of this mode of carrying out the invention is cylindrical. The acid concentration continuous measuring apparatus body 3 can have any structure which enables the sample liquid in the form of a pickling solution to continuously flow from the pickling tank 11, and it is not limited to a particular structure.

The material of which the acid concentration continuous measuring apparatus body 3 is formed can be any one having sufficient acid resistance not to be corroded by the pickling solution. In the present mode for carrying out the invention, it is made of polypropylene. The portion of the circulation path 2 which is formed within the acid concentration continuous measuring apparatus body 3 is straight, with as few portions such as elbows in which the flow speed decreases as possible. As a result, within the acid concentration continuous measuring apparatus body 3, clogging due to a decrease in the flow speed of the pickling solution can be suppressed as much as possible. In this mode of carrying out the invention, the pickling solution flows through the circulation flow path 2 in the condition in which it taken from the pickling tank 11, and dilution of the pickling solution is not carried out.

In order to maintain the measuring accuracy of the density sensor 4, the temperature sensor 5, and the conductivity sensor 6, the flow speed of pickling solution flowing in the portion of the circulation flow path 2 is preferably at most 2 m/sec. In the present mode of carrying out the invention, the flow speed of the pickling solution is set at 1 m/sec.

In this mode of carrying out the invention, a conventional differential pressure sensor having two sensing portions, 4-1,4-2 is used as the density sensor 4. In order to maintain a desired accuracy of density measuring, the two sensing portions 4-1 and 4-2 are installed in roughly the midportion in the longitudinal direction of the acid concentration continuous measuring apparatus body 3 with a separation $d_1$ between them of at least 500 mm in the direction in which the portion of the circulation path 2 is formed.

In this mode of carrying out the invention, a conventional platinum resistor-type temperature sensor is used as the temperature sensor 5. A conventional electromagnetic induction type of conductivity sensor is used as the conductivity sensor 6. The temperature sensor 5 and the conductivity sensor 6 are both installed at the top of the acid concentration continuous measuring apparatus body 3 so as to be able to perform measurements on the exit side of the portion of the circulation flow path 2.

In the present mode of carrying out the invention, the temperature sensor 5 and the conductivity sensor 6 are both installed on the acid concentration continuous measuring apparatus body 3. This is so as to reduce measuring errors as much as possible by installing the temperature sensor 5 and the conductivity sensor 6 in the vicinity of the density sensor 4. However, the temperature sensor 5 and the conductivity sensor 6 need not be installed on the acid concentration continuous measuring apparatus body 3. It is also possible to install the temperature sensor 5 and the conductivity sensor 6 within the pickling tank 11, on the circulation flow path 2 between the pickling tank 11 and the acid concentration continuous measuring apparatus body 3, etc., and to measure the temperature and conductivity of the circulating pickling solution. In this case, the deviations in the measured data between the values of temperatures and conductivity in the vicinity of the density sensor 4 and those where the temperature sensor 5 and the conductivity sensor 6 are installed are determined in advance, and using these deviations, the measured data where the temperature sensor 5 and the conductivity sensor 6 are installed can be corrected. As a result, the measurement error can be reduced as much as possible even if the temperature sensor 5 and the conductivity sensor 6 are not installed in the vicinity of the density sensor 4.

Figure 4:
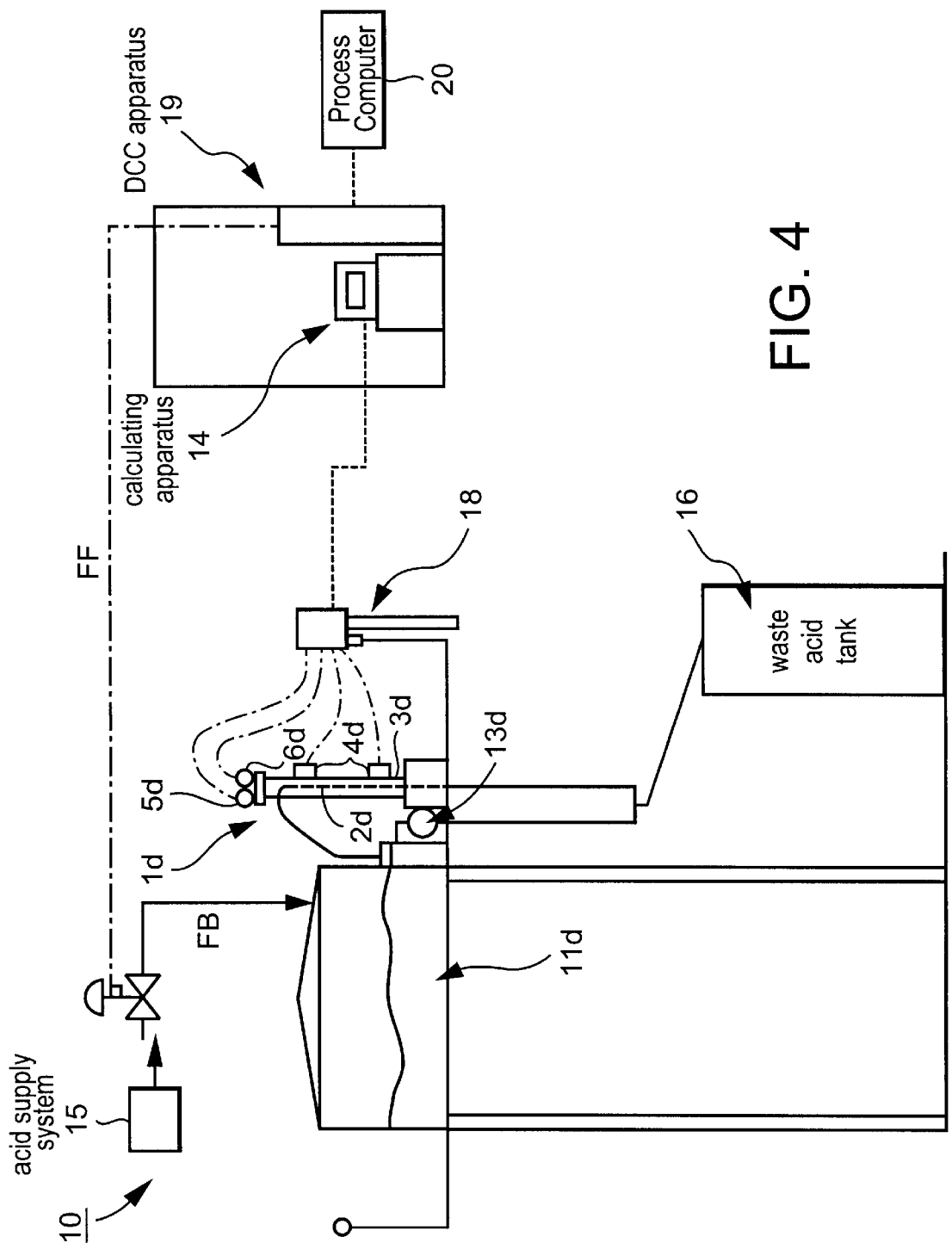
FIG. 4 is an explanatory view schematically showing a final pickling tank applied to an acid concentration automatic control apparatus according to the present invention.

As shown in FIG. 4, which will be described later, in this mode of carrying out the present invention, the acid concentration continuous measuring apparatus 1 is installed in the vicinity of the outer wall surface of the pickling tank 11. The acid concentration continuous measuring apparatus 1 makes the pickling solution in the tank 11 flow in a single direction by means of the pump 13 installed in the vicinity of the pickling tank 11. As a result, the acid concentration automatic measuring apparatus 1 can measure each of the density, the temperature, and the conductivity of the pickling solution at sufficiently short measurement intervals.

As shown in FIG. 2, in the acid concentration continuous measuring apparatus 1, a flow dividing portion 8 which leads pickling solution to the two sensing portions 4-1 and 4-2 of the density sensor 4 is necessarily formed. The flow dividing portion 8 constitutes a portion of the circulation flow path 2, and it is in a location where the flow speed of the pickling solution decreases and iron chloride crystals precipitate, so it is a location which is easy to clog. In the present mode of carrying out the invention, a purge pipe 9 is installed in the flow dividing portion 8 as a clogging preventing mechanism. Pickling solution passes through the purge pipe 9 and is jetted towards the flow dividing portion 8. As a result, pickling solution is prevented from lingering in the flow dividing portion 8, and clogging by the pickling solution can be prevented with certainty.

In this manner, the density sensor 4, the temperature sensor 5, and the conductivity sensor 6 used in the acid concentration continuous measuring apparatus 1 of this mode of carrying out the invention are all publicly known industrial instruments with proven records of operation.

Therefore, the acid concentration continuous measuring apparatus 1 of this mode of carrying out the invention can measure the density, the temperature, and the conductivity of the pickling solution with extremely high precision and accurately.

Furthermore, in the acid concentration continuous measuring apparatus 1 of this mode of carrying out the invention, a calculating apparatus 14 is provided which calculates the acid concentration of the pickling solution based on the density measured by the density sensor 4, the temperature measured by the temperature sensor 5, and the conductivity measured by the conductivity sensor 6. The acid concentration of the pickling solution is calculated by the calculating apparatus 14. The calculation of the acid concentration by the calculating portion 14 will be described below while referring to FIGS. 3 and 4.

As stated previously, the acid concentration continuous measuring apparatus body 3 of the acid concentration continuous measuring apparatus 1 of this mode of carrying out the invention is in the shape of a simple cylindrical tube. For this reason, the following effects (i)–(vii) are achieved.

(i) The shape of each portion of the circulation flow path 2 is as straight as possible, and the purge pipe 9 is provided in the flow dividing portion 8. Therefore, lingering of the pickling solution within the circulation flow path 2 and particularly in the vicinity of the density sensor 4, the temperature sensor 5, and the conductivity sensor 6 is prevented, and the pickling solution can flow continuously.

(ii) The pickling solution flows continuously in the circulation flow path 2. Therefore, local variations in the concentration of the pickling solution within the circulation flow path 2 are prevented, and a plurality of types of pickling solution which are separately collected can be accurately measured under the same conditions.

(iii) The pickling solution is made to continuously flow by the pump 13, and the purge pipe 9 is provided in the flow dividing portion 8 of the circulation flow path 2 which is formed with as few portions as possible where flow speed decreases. Therefore, the ease of maintenance and the ease of cleaning the interior of the acid concentration continuous measuring apparatus body 3 are both enormously improved. Accordingly, measurement can be performed while preventing clogging by the pickling solution.

(iv) The density, the temperature, and the conductivity of the pickling solution are measured, so the acid concentration of the pickling solution can be measured. As a result, by, for example, performing feedback control or a combination of feedback control and feed forward control to adjust the acid concentration of the final pickling tank 11*d* of a continuous pickling line, the acid concentration continuous measuring apparatus 1 can automatically control the acid concentration of the pickling solution in the final pickling tank 11*d* substantially continuously and with high accuracy.

(v) As shown in FIG. 1, the acid concentration continuous measuring apparatus 1 has an extremely simple external shape. Therefore, there is much freedom in where it can be installed in a continuous pickling line, etc.

(vi) As shown in FIG. 1, the interior of the acid concentration continuous measuring apparatus 1 has a simple internal structure. As a result, the flow speed of the pickling solution flowing in the circulation flow path 2 can be easily set and controlled to be a flow speed of at most 2 m/sec which is desirable from the viewpoint of the accuracy of measurement of the density sensor 4, the temperature sensor 5, and the conductivity sensor 6. Therefore, it is easy to maintain the measuring accuracy of the acid concentration continuous measuring apparatus 1.

(vii) The acid concentration continuous measuring apparatus 1 has a simple structure, so it can be easily installed in the vicinity of a pickling tank 11. As a result, the length of the piping which forms the circulation flow path 2 taking pickling solution from the pickling tank 11 can be made as short as possible. Therefore, the time delay between when the pickling solution leaves the pickling tank 11 and when it arrives at the acid concentration continuous measuring apparatus 1 can be made as short as possible. Due to this, the acid concentration continuous measuring apparatus 1 suppresses decreases measurement accuracy.

Acid Concentration Automatic Control Apparatus

Figure 3:
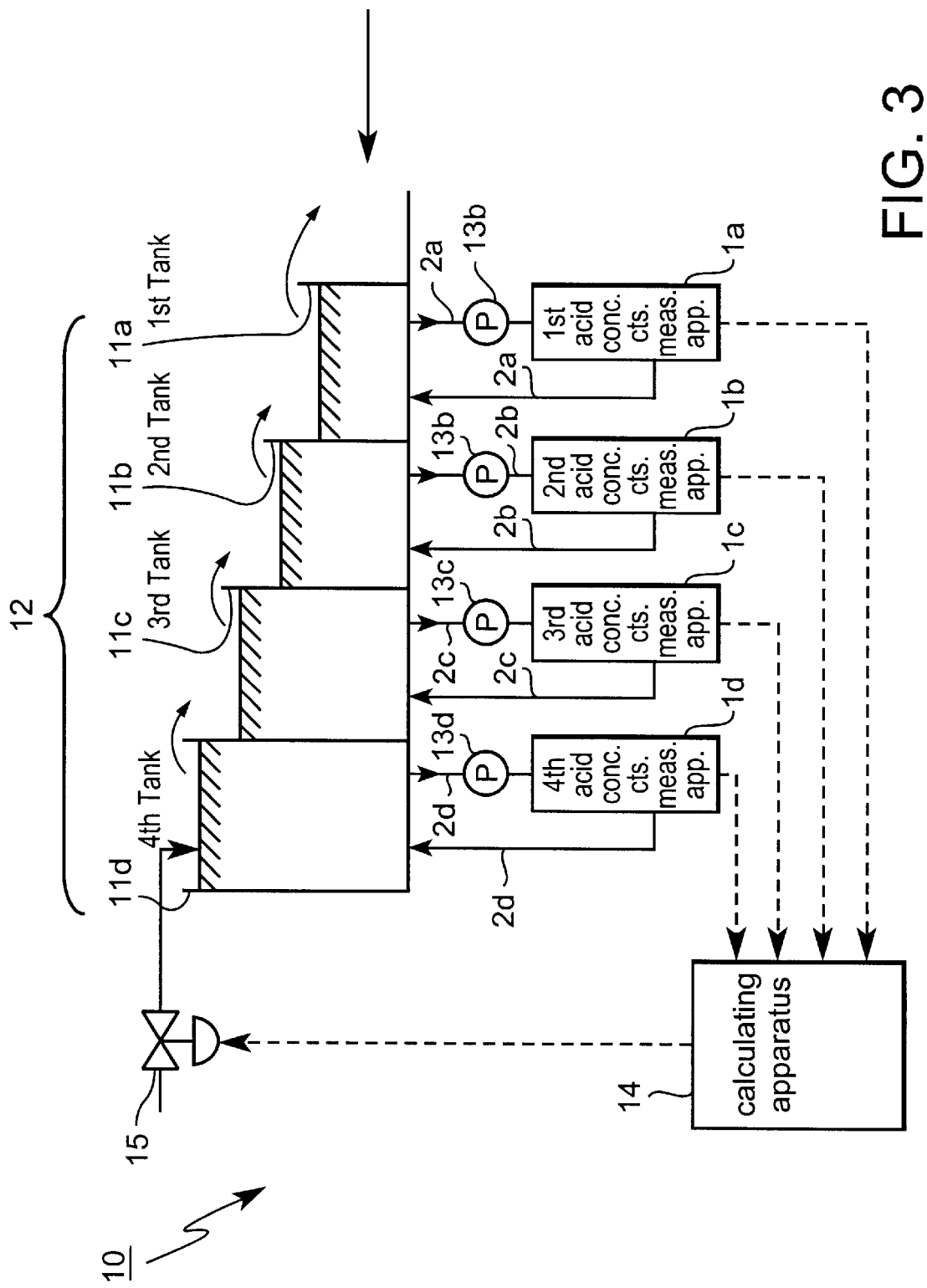
FIG. 3 an explanatory view of an example of a control system for the case in which an acid concentration automatic control apparatus of a first mode of carrying out the invention is applied to a continuous pickling line.

Next, a mode of carrying out an acid concentration automatic control apparatus according to the third invention will be described. FIG. 3 is an explanatory view schematically illustrating one example of a control system for the case in which the acid concentration automatic control apparatus 10 of this mode of carrying out the invention is applied to a continuous pickling line 12. FIG. 4 is an explanatory view schematically showing a final pickling tank 11d using the acid concentration automatic control apparatus 10 of this invention.

In this continuous pickling line 12, four pickling tanks are provided in series. A fourth tank 11d is a final pickling tank. A third tank 11c, a second tank 11b, and a first tank 11a are provided in series on the upstream side of the fourth tank 11d. A steel strip to be pickled (hot rolled steel strip in this example) is not shown but is transported from right to left in the figures. As a result, the steel strip is pickled while being successively immersed in tanks 11a–11d. In the explanation of FIGS. 3 and 4, equipment associated with the first tank 11a will be affixed with the symbol a, that associated with the second tank 11b will be affixed with the symbol b, that associated with the third tank 11c will be affixed with the symbol c, and that associated with the fourth tank 11d will be affixed with the symbol d.

In order to measure the density, the temperature, and the conductivity of the pickling solution in each pickling tank 11a–11d substantially continuously, acid concentration continuous measuring apparatuses 11a–11d of the above-described mode of carrying out the invention are connected through pumps 13a–13d to each pickling tank 11a–11d of this continuous pickling line 12. Pickling solution is pumped by the pumps 13a–13d from the tanks 11a–11d through circulation flow paths 2a–2d. The pickling solution which is pumped flows through the portions of the circulation flow paths 2a–2d formed within the acid concentration continuous measuring apparatuses 1a–1d and is returned to pickling tanks 11a–11d. While the circulating pickling solution is flowing in the portions of the circulation flow paths 2a–2d formed within the acid concentration continuous measuring apparatuses 1a–1d, its density, temperature, and conductivity are measured substantially continuously by density sensors 4a–4d, temperature sensors 5a–5d, and conductivity sensors 6a–6d.

As shown in FIGS. 3 and 4, filtering apparatuses for preventing clogging are not installed in circulation flow paths 2a–2d. In the acid concentration continuous measuring apparatus 1 of this mode of carrying out the invention, even if filtering apparatuses for preventing clogging are not installed on circulation paths 2a–2d, clogging due to lingering of pickling solution does not develop. On the contrary, if a filtering apparatus for preventing clogging is provided in the circulation flow path 2, there is the danger of the occurrence of clogging in the filtering apparatus.

The acid concentration continuous measuring apparatuses 1a–1d are connected to a calculating apparatus in the form of a DDC (direct digital control) apparatus 14. Control signals from the DDC apparatus 14 are sent as switching signals for a valve 15 which controls the supply of acid solution (hydrochloric acid) to the final pickling tank 11d.

In this manner, the acid concentration automatic control apparatus 10 of this mode of carrying out the invention supplies acid solution only to the fourth tank 1d, which is the final pickling tank, and it does not supply acid to the first tank 11a through the third tank 11c. However, pickling solution overflows from the fourth tank 11d to the third tank 11c, from the third tank 11c to the second tank 11b, and from the second tank 11b to the first tank 11a. Therefore, the acid concentration of the pickling solution in the pickling tanks 11a–11c other than the fourth tank 11d, which is the final pickling tank, is maintained roughly constant, even while repeatedly rising and falling.

In the acid concentration automatic control apparatus 10 of this mode of carrying out the invention, the measured values of density, temperature, and conductivity which are obtained at sufficiently short measurement intervals by the acid concentration continuous measuring apparatuses 1a–1d are sent to the DDC apparatus 14 as digital signals. Based on the data for the final pickling tank 11d out of the transmitted data, the DDC apparatus 14 calculates the acid concentration of the pickling solution in the final pickling tank 11d in a manner to be described below.

In the acid concentration automatic control apparatus 10 of this mode of carrying out the invention, the data obtained from the pickling tanks 11a–11c other than the final pickling tank 11d is used in performing feed forward control to adjust the acid concentration of the pickling solution in the final pickling tank 11d. This feed forward control will be described below.

The DDC apparatus 14 compares the calculated acid concentration of the pickling solution in the final pickling tank 11d with a previously determined target value for the acid concentration. The DDC apparatus 14 calculates the amount of acid solution to be supplied to the final pickling tank 11d which will set the deviation between the two values to zero. The calculated amount of acid solution to be supplied is sent from the DDC apparatus 14 to the switching mechanism of the valve 15 as an acid supply control signal. As a result, the opening and closing of the valve 15 are controlled, and the amount of acid supplied to the final pickling tank 11d is varied. In this manner, the acid concentration of the pickling solution in the final pickling tank 11d undergoes feedback control.

Namely, in FIG. 4, the acid concentration automatic control apparatus 10 of this mode of carrying out the invention comprises the final pickling tank 11d, an acid supply system 15 for the final pickling tank 11d, and an acid concentration continuous measuring apparatus 1d having a calculator (a data processing computer) 14. The acid concentration of the pickling solution in the final pickling tank 11d is calculated by the calculator 14 based on the data on density, temperature, and conductivity measured by the acid concentration continuous measuring apparatus 1d. The waste acid tank 16 shown in FIG. 4 is a tank for treating waste acid which has overflowed from the first pickling tank 11a and is connected to the first pickling tank 11a.

Figure 5A:
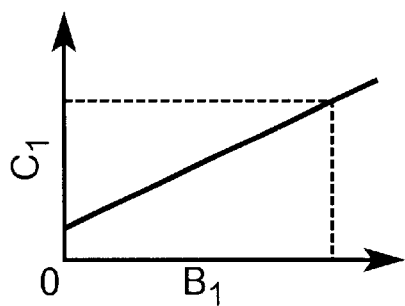
FIGS. 5(a) and 5(b) are graphs respectively showing the relationships between the adjusted values of the HCL concentration $B_1$ and iron chloride concentration $B_2$ and the corresponding measured values $C_1$ and $C_2$.
Figure 5B:
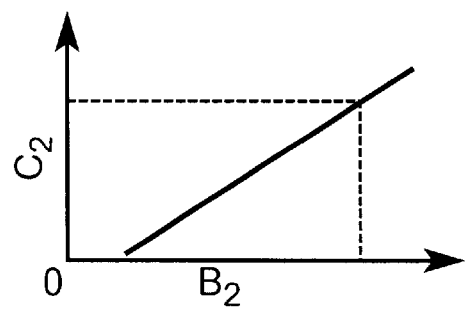

FIGS. 5(a) and 5(b) are graphs showing the relationships between the corrected values $B_1$ and $B_2$ of hydrochloric acid concentration and iron chloride concentration and the corresponding measured values thereof $C_1$ and $C_2$. By making the curves shown in the graphs in advance, the corrected values $B_1$ and $B_2$ of hydrochloric acid concentration and iron chloride concentration can be easily determined.

Figure 6:
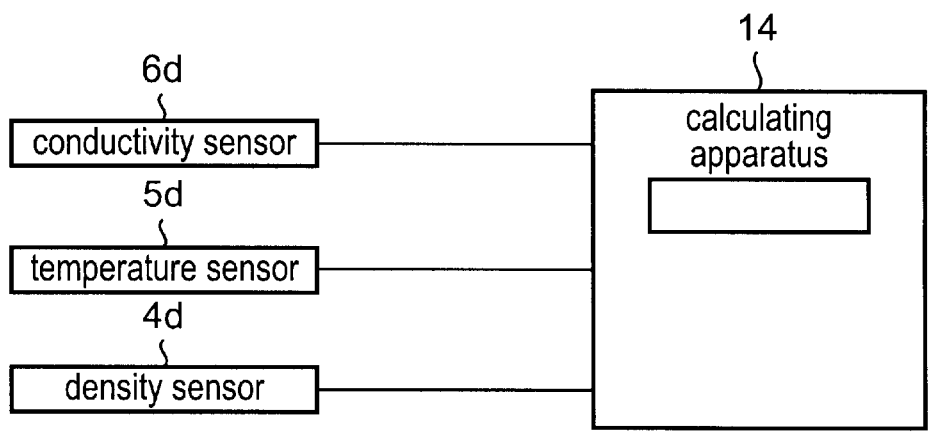
FIG. 6 is an explanatory view outlining processing of the measured values obtained from a density sensor, a temperature sensor, and a conductivity sensor.

FIG. 6 is an explanatory view schematically showing processing of the measured values obtained by the density sensor 4d, the temperature sensor 5d, and the conductivity sensor 6d. As shown in this figure, the results of measurement by the density sensor 4d, the temperature sensor 5d, and the conductivity sensor 6d are input to the calculator 14 after being converted to analog signals by an amplifier board (conversion board) 18 in FIG. 4.

An example of a formula for use by the calculator 14 in calculating the hydrochloric acid concentration and the iron chloride concentration is as follows:

$$SA = S - a(T-25) \tag{1}$$

$$DA = D + b(T-25) \tag{2}$$

$$\text{hydrochloric acid concentration} = c(d\{e \cdot SA + f \cdot SA(DA-1)\} - g\{h \cdot SA + i \cdot SA(DA-1)\} + j) + k \tag{3}$$

$$\text{iron chloride concentration} = m(n \cdot DA - SA) - p \tag{4}$$

Here, S is the measured electrical conductivity, T is the measured temperature, SA is the value of conductivity corrected for temperature, DA is the measured density, and symbols a–p are constants.

By plugging the values of density, temperature, and conductivity which are measured at sufficiently short measurement intervals into the above relational formulas (1)–(4), the hydrochloric acid concentration and the iron chloride concentration in each of pickling tanks 11a–11d are found. In this mode of carrying out the invention, the acid concentration of the final pickling tank 11d is found from the measured values of the pickling solution in the final pickling tank 11d.

Then, in order to set the deviation between the hydrochloric acid concentration obtained in this manner and a target hydrochloric acid concentration to zero, a control signal which determines the amount of acid solution to be supplied is output from the calculator 14 to the hydrochloric acid supply system 15.

In this way, in the acid concentration automatic control apparatus 10 of this mode of carrying out the invention, the acid concentration of the pickling solution is determined from the measured values of the density, the temperature, and the conductivity of the pickling solution in the final pickling tank 11d, and feedback control of the acid concentration of the pickling solution in the final pickling tank 11d is carried out so that the determined acid concentration will equal a target value.

Namely, a first characteristic of the acid concentration automatic control apparatus 10 of this mode of carrying out the invention is a combination of the acid concentration continuous measuring apparatus 1d and feedback control of the supply of acid solution to the fourth tank 11d in order to optimize the supply of acid solution, which is carried out only with respect to the fourth tank 11d. As a result, using the measured value of acid concentration, which is a continuous measured value of acid concentration which has measurement intervals of essentially zero, feedback control of the amount of the acid solution supplied to the final pickling tank 11d can be carried out. According to the acid concentration automatic control apparatus 10 of this mode of carrying out the invention, the responsiveness of acid concentration control can be enormously improved. As a result, variations in the acid concentration can be made small, deviations of the acid concentration towards a high concentration can be suppressed, and a rise in the acid consumption per unit of output can be suppressed as much as possible.

Furthermore, in the acid concentration automatic control apparatus 10 of this mode of carrying out the invention, in order to further improve the responsiveness of acid concentration control, feed forward control of the acid concentration of the pickling solution in the final pickling tank 11d is carried out using the measured data on the acid concentration of the pickling solution in the pickling tanks 11a–11c other than the final tank 11d. Below, feed forward control of this mode of carrying out the fifth invention and sixth invention will be described.

In FIG. 3, the acid concentration of pickling solution in pickling tanks 11a–11c is measured by acid concentration continuous measuring apparatuses 1a–1c installed on pickling tanks 11a–11c other than the final pickling tank 11d. Measurement by the acid concentration continuous measuring apparatuses 1a–1c is the same as that performed by acid concentration continuous measuring apparatus 1d.

Based on the results of measurement by acid concentration continuous measuring apparatuses 1a–1c, the acid concentration per unit period of time in pickling tanks 11a–11c is found. Based on the acid consumption per unit period of time in pickling tanks 11a–11c, the acid consumption per unit period of time in the final pickling tank 11d is predicted.

Namely, the acid consumption per unit period of time in each of pickling tanks 11a–11d abruptly varies depending upon the amount of pickling solution carried out of the tanks with the strip. The amount of pickling solution carried out of the tanks with the strip is approximately proportional to the thickness of the steel plate being treated, the plate width, and the line speed. Therefore, by measuring the changes in the acid concentration in pickling tanks 11a–11c by the acid concentration continuous measuring apparatuses 1a–1c, the variations in the acid concentration of the pickling solution in the final pickling tank 11d, i.e., the consumption of acid can be predicted with high accuracy. It is not necessary to use the actual values of acid consumed per unit time for all of pickling tanks 11a–11c. For example, it is possible to use the actual data for the third pickling tank 11c next to the final pickling tank 11d, and to omit measurements for the other pickling tanks.

Namely, in FIG. 4, when the previously described feedback control is performed, the actual values of the plate thickness, the plate width, and the line speed are input into a process computer 20 of the continuous pickling line. Therefore, the process computer 20 of the continuous pickling line is connected to the DDC apparatus 19 so that this data is input to the DDC apparatus 19.

Namely, the amount of supplied acid which is calculated by the feedback control performed by the calculating apparatus 14 is input to the DDC apparatus 19. In addition, the actual values of the plate thickness, the plate width, and the line speed from the process computer 20 for the continuous pickling line and the variation in the acid concentration in pickling tanks 11a–11c calculated by the calculating apparatus 14 are input to the DDC apparatus 19. Then, the consumed amount of acid in the final pickling tank 11d is predicted based on the percent decrease in the acid concentration of the pickling solution in each of pickling tanks 11a–11c, and the amount of supplied acid which is calculated by feedback control is further corrected and modified by feed forward control.

Prediction of the decrease in the hydrochloric acid concentration from the actual values of the plate thickness, the plate width, and the line speed can be carried out in the following manner, for example.

In FIGS. 3 and 4, the hydrochloric acid concentration in pickling tanks 11a–11c is found using the above-described formulas (3) and (4). Based on the hydrochloric acid concentration found in this manner, the consumption of hydrochloric acid, i.e., the decrease thereof is predicted from the correlation formulas (analytical curves) shown in FIGS. 5(a) and 5(b) which are previously determined as a function of the plate thickness, the plate width, and the line speed. The feed forward control function FF is found by the following formula (5), for example.

$$FF = K_F \cdot W \cdot f(d) \cdot g(Ls) \qquad (5)$$

In formula (5), the symbol $K_F$ indicates a concentration variation coefficient, W indicates the plate width, f(d) indicates the plate thickness, and g(Ls) indicates the line speed.

Namely, according to the fifth and sixth inventions, by addition and subtraction using feedback control, deviation of the acid concentration of pickling solution in the final pickling tank 11d with respect to a target value can be suppressed. Furthermore, according to the fifth and sixth inventions, the amount of acid solution to be supplied which is found by feedback control is corrected by predicting the amount of acid solution to be supplied by multiplication and addition by feed forward control. As a result, according to the fifth and sixth inventions, the supply of hydrochloric acid to the final pickling tank can be controlled with extremely high accuracy.

In this manner, in the fifth and sixth inventions, based on the actual values of the consumption of acid in pickling tanks 11a–11c, feed forward control which modifies the supply of acid to the final pickling tank 11d is superposed on feedback control. As a result, the acid concentration can be controlled with high accuracy and with an extremely small time lag even when the acid concentration in the final pickling tank 11d undergoes sudden decreases due to pickling solution being carried out of the tank with the strip, which feedback control using only the acid concentration in the final pickling tank 11d cannot rapidly respond to.

As explained above, in the acid concentration automatic control apparatus 10 of the third invention, an acid concentration continuous measuring apparatus 1d and a feedback control means employing a continuously measured value of acid concentration of pickling solution in the final pickling tank 11d are combined with each other. As a result, the amount of acid solution supplied to the final pickling tank 11d which is the pickling tank to which acid solution is supplied can be found essentially continuously, and the acid concentration of the pickling solution in the final pickling tank 11d can be controlled to a target value speedily and with high precision.

Furthermore, according to the fifth invention in which feed forward control is added for predicting the acid consumption in the final pickling tank 11d using the variation in the acid concentration of the pickling solution in each of pickling tanks 11a–11c, it is possible to speedily respond to sudden drops in the acid concentration of the pickling solution in the final pickling tank 11d due to pickling solution being carried out of the tank with the strip, and a suitable amount of acid solution to be supplied can be determined.

In this manner, in the acid concentration automatic control apparatus 10 of this mode of carrying out the third invention and the fifth invention, (i) an acid concentration continuous measuring apparatus 1d which substantially continuously measures the density, the temperature, and the conductivity of pickling solution in the final pickling tank 11d of a continuous pickling line 12, (ii) a feedback control means which determines the hydrochloric acid concentration and the iron chloride concentration i.e., the concentration of iron ions, in the final pickling tank 11d based on a previously determined correlation formula employing the measured values, which outputs the result, which compares the hydrochloric acid concentration of the pickling solution in the final pickling tank 11d with a target value, and which varies the amount of acid solution supplied to the final pickling tank 11d so that the difference becomes zero, and (iii) a feed forward control apparatus which finds the consumption of acid in pickling tanks 11a–11c using the plate thickness, the plate width, the line speed, and the results of measurement of the concentration of hydrochloric acid and iron chloride in pickling tanks 11a–11c, and based on this varies the supplied amount of acid to the final pickling tank 11d are combined with each other. As a result, a response lag and a decrease in the accuracy of the control of acid concentration during automatic control of the supply of the acid solution to the final pickling tank 11d can both be done away with.

Second Mode of Carrying Out the Invention

Next, an acid concentration automatic control apparatus of this mode of carrying out of the fourth invention will be described.

Figure 7A:
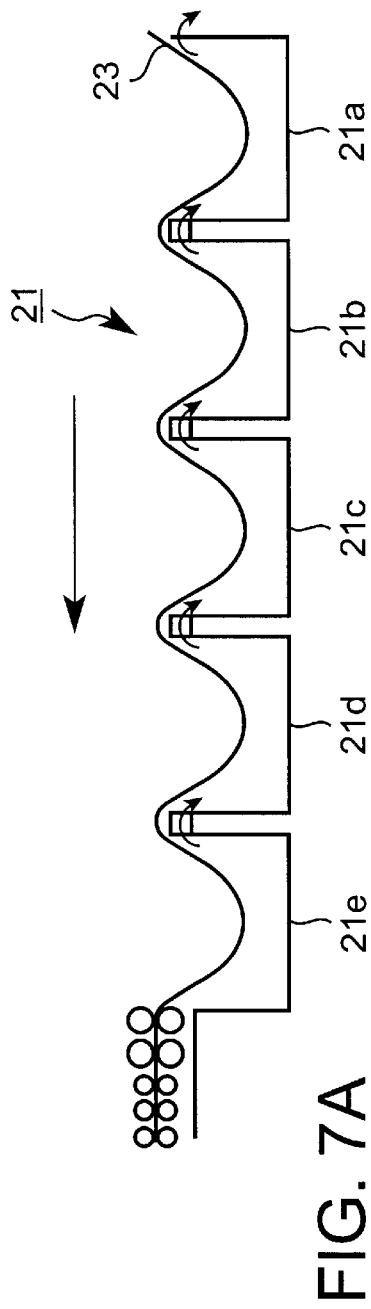
FIG. 7(a) is an explanatory view of a continuous pickling line of the type in which pickling solution in a pickling tank on a downstream side is made to successively overflow to adjoining pickling tanks on an upstream side and FIG. 7(b) is an explanatory view showing the state in which an acid concentration automatic control apparatus of a second mode of carrying out the invention is applied to this continuous picking line.
Figure 7B:
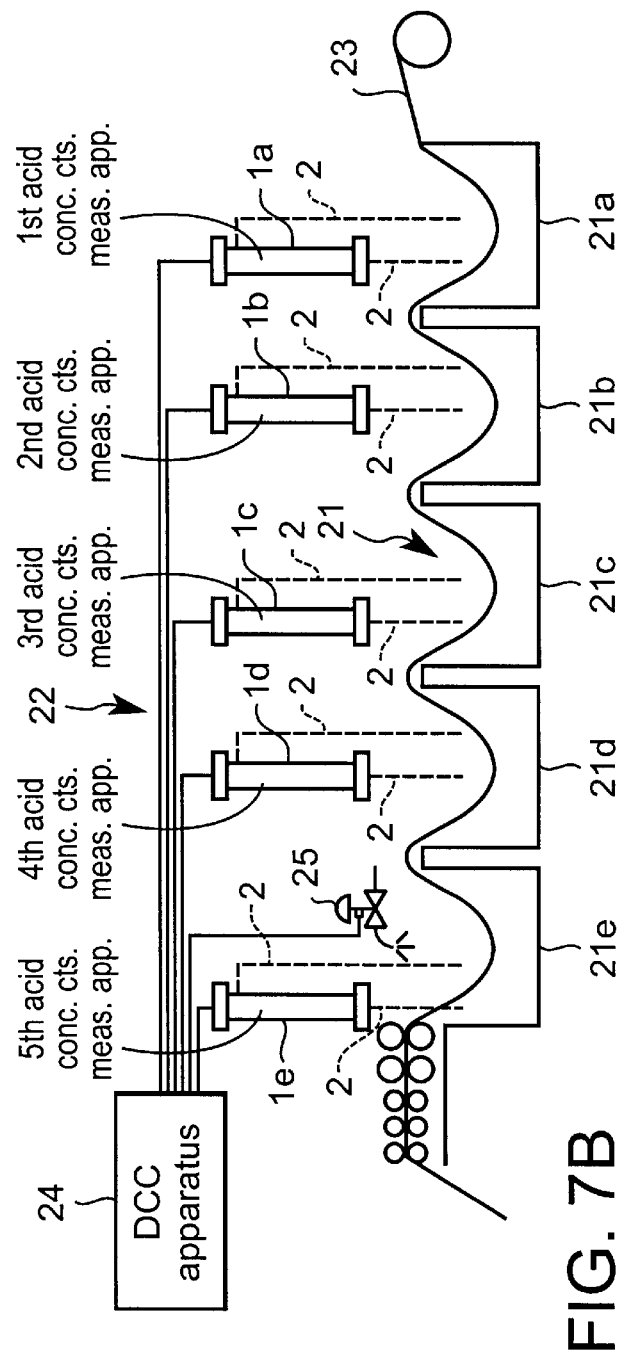

FIG. 7(a) is an explanatory view of a continuous pickling line 21 of the type in which pickling solution in a pickling tank on a downstream side is made to successively overflow to adjoining pickling tanks on an upstream side. FIG. 7(b) shows the situation in which an acid concentration automatic control apparatuses 22 of this mode of carrying out the invention is applied to the continuous pickling line 21.

As shown in FIG. 7(a) in this continuous pickling line 21, five pickling tanks are installed in series. In this continuous pickling line 21, a fifth tank 21e is a final pickling tank. A fourth tank 21d, a third tank 21c, a second 21b, and a first tank 21a are installed in series on the upstream side of the fifth tank 21e. As shown in the figure, a steel strip 23 to be pickled (a hot rolled steel strip in this example) is transported from the right side to the left side in the figure. This steel strip 23 is pickled while being successively immersed in each of tanks 21a–21e. In this explanation of FIGS. 7(a) and 7(b), equipment associated with the first tank 21a is affixed with symbol a, that associated with the second tank 21b is affixed with the symbol b, that associated with the third tank 21c is affixed with symbol c, that associated with the fourth tank 21d is affixed with symbol d, and that associated with the fifth (the final pickling tank) 21e is affixed with symbol e.

As shown in FIG. 7(b), each pickling tank 21a–21e of this continuous pickling line 21 is connected to an acid concentration continuous measuring apparatus 1a–1e like that shown in FIG. 1 and FIG. 2 through five corresponding unillustrated pumps in order to measure the density, the temperature, and the conductivity of the pickling solution in each of the pickling tanks 21a–21e. The pickling solution is pumped from the pickling tanks 21a–21e by the five pumps. The pumped pickling solution passes through circulation flow paths 2a–2e and through a portion of the circulation flow paths 2a–2e formed within the acid concentration continuous measuring apparatuses 1a–1e and is circulated to each pickling tank 21a–21e. While the pickling solution is flowing through the portions of the circulation flow paths 2a–2e, its density, temperature, and conductivity are substantially continuously measured by density sensors 4a–4e, temperature sensors 5a–5e, and conductivity sensors 6a–6e, respectively.

The acid concentration continuous measuring apparatuses 1a–1e are connected to a calculating apparatus in the form of a DDC (direct digital control) apparatus 24. The control signals from the DDC apparatus 24 are sent as open and close signals to a valve mechanism 25 which controls the supply of acid solution to the final pickling tank 21e.

In this manner, in the acid concentration automatic control apparatus 22 of this mode of carrying out the invention, acid solution is supplied only to the fifth tank 21e which is the final pickling tank, and acid is not supplied to the first tank 21a—the fourth tank 21d. However, in this continuous pickling line 21, pickling solution overflows from the fifth tank 21e to the fourth tank 21d, from the fourth tank 21d to the third tank 21c, from the third tank 21c to the second tank 21b, and from the second tank 21b to the first tank 21a. Therefore, the acid concentration of each pickling tank 21a–21d of the acid concentration continuous control apparatus 22 is maintained substantially constant even while repeatedly rising and falling.

In the acid concentration automatic control apparatus 22 of this mode of carrying out the invention, the measured values of density, temperature, and conductivity obtained by the acid concentration continuous measuring apparatuses 1a–1e are sent to the DDC apparatus 24 as data signals. The DDC apparatus 24 calculates the acid concentration of the pickling solution in the final pickling tank 21e in a manner to be described below based on the data for the final pickling tank 21e and the fourth tank 21d out of all the transmitted data.

The DDC apparatus 24 compares the calculated acid concentration of the pickling solution in the final pickling tank 21e and the fourth tank 21d with previously determined corresponding target values. Then, the DDC apparatus 24 calculates the amount of acid solution to be supplied to the final pickling tank 21e.

Figure 8:
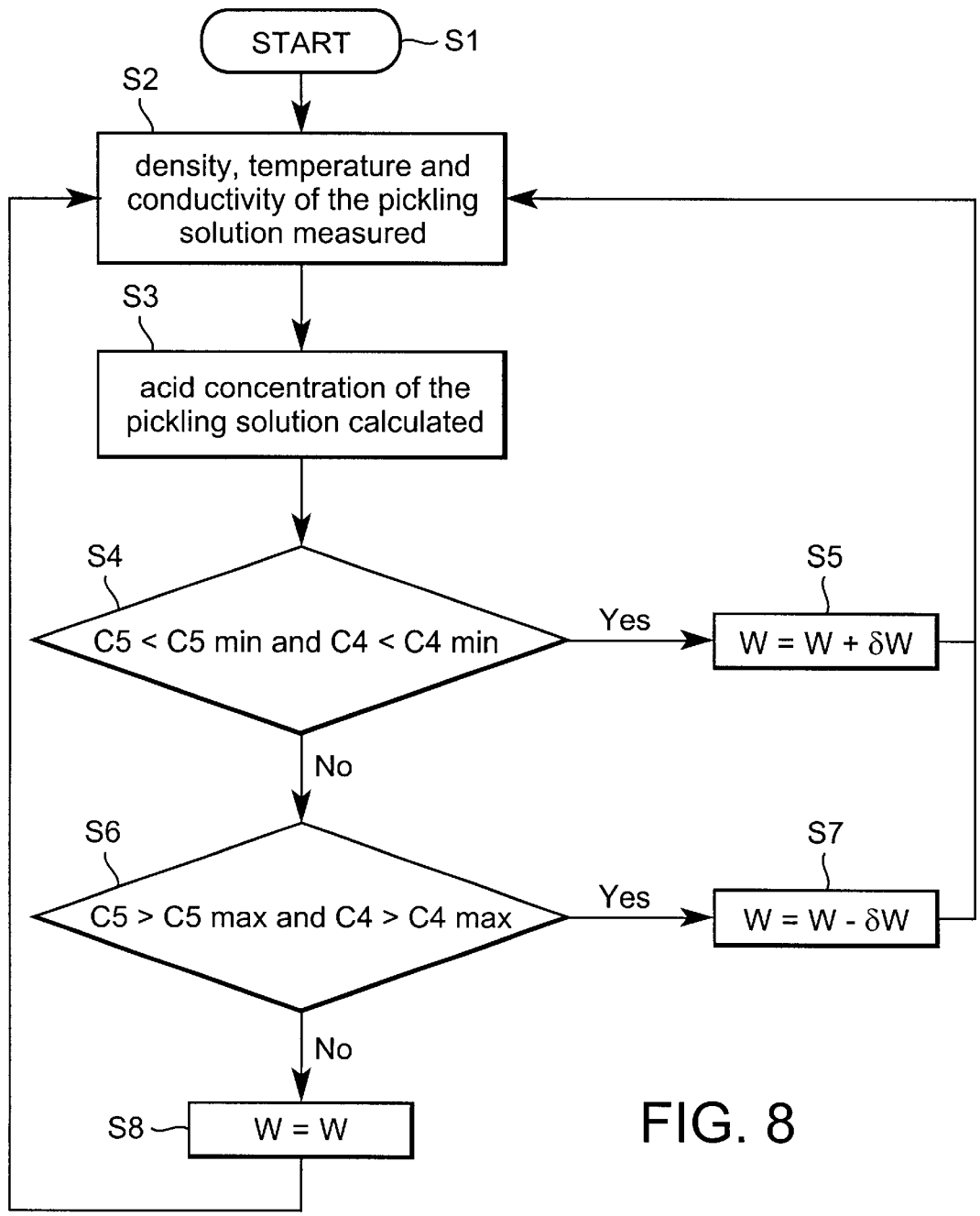
FIG. 8 is a flow chart showing the sequence of calculations in a DDC apparatus of the amount of acid solution to supply.

FIG. 8 is a flow chart showing the flow of calculations in the DDC apparatus 24 for determining the amount of acid to be supplied. Next, while referring to the flow chart of FIG. 8, the flow of calculations in the DDC apparatus 24 for determining the amount of acid to be supplied will be described.

In Step (abbreviated below as S) 1, the DDC apparatus 24 is started and feedback control begins. After startup of the DDC apparatus 24, control proceeds to S2.

In S2, the density, the temperature, and the conductivity of the pickling solution in each of pickling tanks 21a–21e is measured by acid concentration continuous measuring apparatuses 1a–1e, respectively. After the start of measurement, control proceeds to S3.

In S3, based on the density, the temperature, and the conductivity of the pickling solution measured by the acid concentration continuous measuring apparatuses 1a–1e, using the above-described formulas (1)–(3), the acid concentration of the pickling solution in each of pickling tanks 21a–21e is calculated. After calculation of the acid concentration, S4 is proceeded to.

In S4, a first determination of the results of acid concentration measurement is carried out. Namely, it is determined (1) whether the calculated value C5 of the acid concentration of the pickling solution in the fifth tank 21e which is the final pickling tank is smaller than a lower control limit $C5_{min}$ for the acid concentration of the pickling solution in the fifth tank 21e, and (2) whether the calculated value C4 for the acid concentration of the pickling solution in the fourth tank 21d is smaller than a lower control limit $C4_{min}$ for the acid concentration of the pickling solution in the fourth tank 21d. If they are smaller, S5 is proceeded to, and if they are not smaller, S6 is proceeded to.

In S5, the amount of acid to be supplied to the fifth tank 21e from the valve mechanism 25 is increased from W to W+δW (wherein δW is a correction in the amount of acid solution to be supplied), and S2 is proceeded to.

In S6, a second determination of the result of acid concentration measurement is performed. Namely, it is determined (1) whether the calculated value C5 for the acid concentration of the pickling solution in the fifth tank 21e which is the final pickling tank is larger than an upper control limit $C5_{max}$ for the acid concentration of the pickling solution in the fifth tank 21e, and (2) whether the calculated value C4 for the acid concentration of the pickling solution in the fourth tank 21d is larger than an upper control limit $C4_{max}$ for the acid concentration of the pickling solution in the fourth tank 21d. If they are larger, S7 is proceeded to, and if they are not larger, S8 is proceeded to.

In S7, the amount of acid solution to be supplied to the fifth tank 21e from the valve mechanism 25 is decreased from W to W−δW, and S2 is proceeded to.

In S8, the amount of acid solution to be supplied to the fifth tank 21e from the valve mechanism 25 is set to be W. Thereafter, S1 is proceeded to, and subsequently S1–S8 are repeated.

In this manner, in the calculations by the DDC apparatus 24 of the amount of acid solution to be supplied, the results of measurement of the acid concentration by each of acid concentration continuous measuring apparatuses 1d and 1e are compared with a previously determined upper control limit and lower control limit for the fourth tank 21d and the fifth tank 21e.

When the results of measurement of acid concentration by the acid concentration continuous measuring apparatuses 1d and 1e are both less than the lower control limits, the previously determined acid supply amount W is increased by the correction value δW. On the other hand, when the results of measurement are both above the lower control limits, the correction value δW is subtracted. As a result, the amount of acid solution supplied to the fifth tank 21e from the valve mechanism 25 is varied, and the flow rate of acid solution which is supplied is changed.

The calculated supply amount W of acid solution is sent from the DDC apparatus 14 to a switching mechanism of valve mechanism 15 as an acid supply control signal, and the opening and closing of valve mechanism 15 is controlled. As a result, the supply of acid solution to the final pickling tank 11d is varied, and feedback control is carried out. Therefore, the acid concentration of the pickling solution in the pickling tanks other than the fifth pickling tank 21e and the fourth pickling tank 21d, i.e., the third pickling tank 21c—the first pickling tank 21a is also stabilized and the overall acid concentration also decreases.

In this manner, according to this mode of carrying out the invention, the results of measurement of the acid concentration of the pickling solution in pickling tanks 21a–21e can be fed back to the determination of the supply of acid solution.

Furthermore, in this mode of carrying out the invention, the acid concentration of not only the pickling solution in the fifth tank 21e which is the final pickling tank but also that in the fourth tank 21d which adjoins the fifth tank 21e can undergo feedback control. As a result, compared to a case in which only the results of measurement of the acid concentration of the pickling solution in the fifth tank 21e are employed, more stable automatic control of the acid concentration of the pickling solution in each of pickling tanks 21a–21e can be performed.

In this manner, in the acid concentration automatic control apparatus 22 of this mode of carrying out the invention, the acid concentration is found from the measured values of the density, the temperature, and the conductivity of the pickling solution in the final pickling tank 21e and the fourth tank 21d, and feedback control of the supply of acid solution is carried out so as to set the acid concentration which is found equal to a target value.

Namely, a characteristic of the acid concentration automatic control apparatus 22 of this mode of carrying out the invention is that according to a first mode of carrying out the invention, in order to further optimize the supply of acid solution which is carried out only with respect to the fifth tank 21e, continuous measurement of acid concentration in the fifth tank 21e and the fourth tank 21d by acid concentration continuous measuring apparatuses 1e and 1d is combined with feedback control of the supply of acid solution to the fifth tank 21e. As a result, using the measured value of acid concentration, i.e., the measured value of acid concentration which is measured substantially continuously at measurement intervals of approximately zero, feedback control of the acid concentration of the pickling solution in the final pickling tank 21e can be carried out, and the responsiveness of control of acid concentration can be enormously improved. In addition, as a result, variations in acid concentration can be decreased, so scattering of the acid concentration towards a high concentration can be decreased, and a rise in acid consumption per unit of output can be suppressed as much as possible.

In addition, in S4 and S6 of the calculations of the supply of acid solution shown in FIG. 8, the acid concentration ranges in the fifth tank 21e and the fourth tank 21d can be divided into still smaller ones.

Furthermore, as shown in the previously described fifth invention, when the amount W of acid solution to be supplied is determined, by performing feed forward control based on information on the steel strip which is to be processed obtained from a process computer or the like for the pickling line, it is possible to further modify the amount of acid solution to be supplied.

Furthermore, in this mode of carrying out the invention, feedback control may be performed in the same manner using values calculated using the measured values for the first tank 21a—second tank 21c. However, in the case in which pickling solution in a tank on a downstream side is made to successively overflow to adjoining pickling tanks on an upstream side and acid solution is supplied to a final pickling tank, control of the concentration by controlling the supply of acid solution to the first tank 21a—the second tank 21c is very difficult compared to that with respect to the fourth tank 21d, so there is little sense in performing feedback control. Therefore, it is possible to omit the installation of acid concentration continuous measuring apparatuses 1a–1c from the first tank 21a—the second tank 21c.

Third Mode of Carrying Out the Invention

Figure 9:
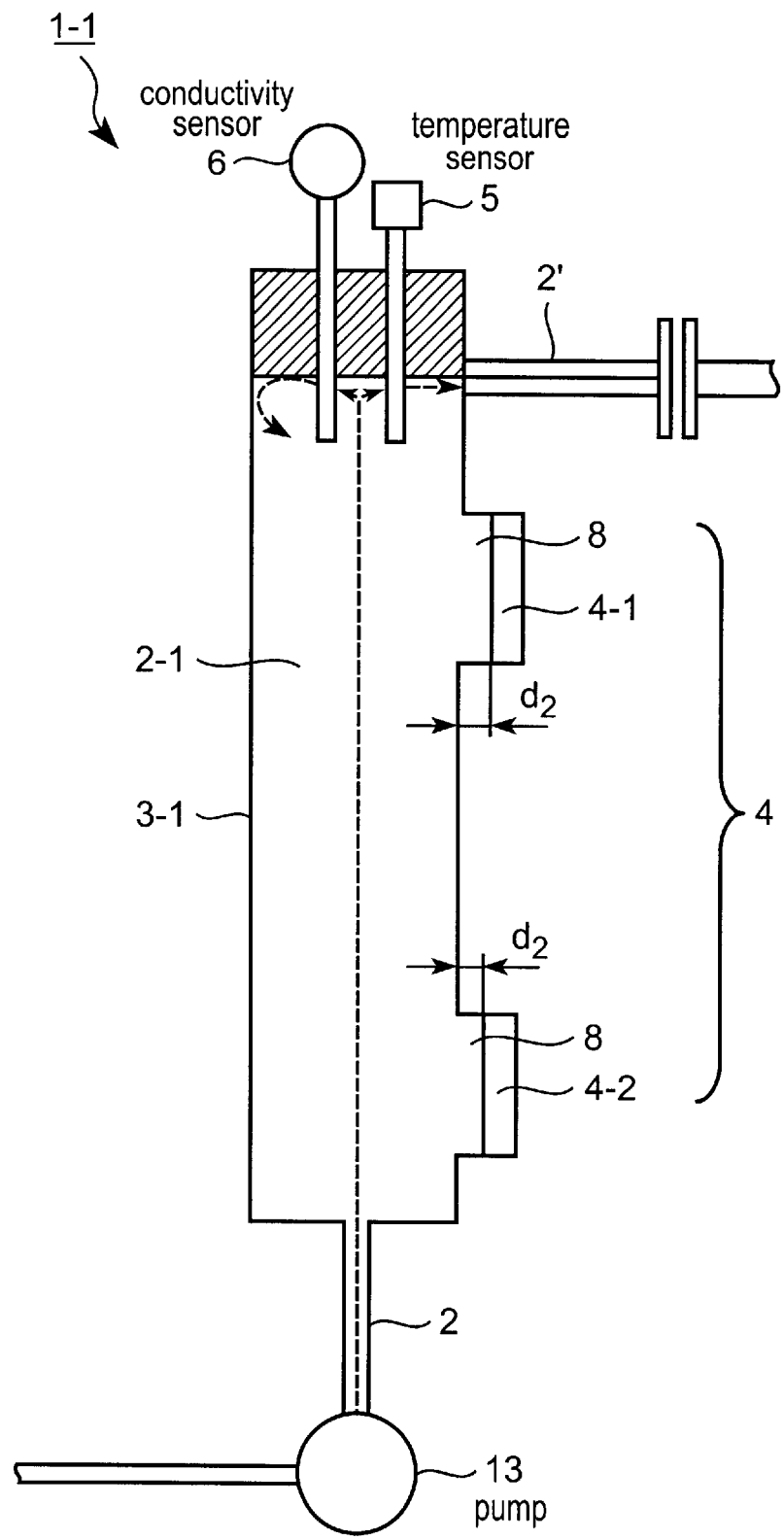
FIG. 9 is an explanatory view of the internal structure of an acid concentration continuous measuring apparatus according to a third mode of carrying out the first invention.

FIG. 9 is an explanatory view showing the internal structure of an acid concentration continuous measuring apparatus of this mode of carrying out the first invention. In the figure, the dashed line arrows show the flow of pickling solution. In the following description of this mode of carrying out the invention, only those portions which are different from the first mode of carrying out the invention will be described, and those portions having the same structure are affixed with the same reference numerals, and a repeated description of these portions will be omitted.

The acid concentration continuous measuring apparatus 1-1 of this mode of carrying out the invention differs from the acid concentration continuous measuring apparatus 1 of the first mode of carrying out the invention principally with respect to the structure of the portion of the circulation flow path 2-1 formed within an acid concentration continuous measuring apparatus body 3-1.

As shown in FIG. 9, within the acid concentration continuous measuring apparatus body 3-1 of the acid concentration continuous measuring apparatus 1-1 of this mode of carrying out the invention, the upper portion of the circulation flow path 2-1 is formed at approximately the same height as a discharge pipe 2'. As a result, as shown by the dashed line arrows in the figure, pickling solution which is pumped by the pump 13 first overflows near the uppermost portion of the interior of the acid concentration continuous measuring apparatus body 3-1 and then is led to the discharge pipe 2'.

Therefore, in the acid concentration continuous measuring apparatus 1-1 of this mode of carrying out the invention, the flow speed of the pickling solution in the circulation flow path 2-1 can be easily set and controlled to be at most 2 m/sec, which speed is desirable from the standpoint of the accuracy of measurement of the density sensor 4, the temperature sensor 5, and the conductivity sensor 6. Accordingly, the acid concentration continuous measuring apparatus 1-1 of this mode of carrying out the invention can further increase the accuracy of measurement even more than can the acid concentration continuous measuring apparatus 1-1 of the first mode of carrying out the invention.

In the acid concentration continuous measuring apparatus 1-1 of this mode of carrying out the invention, the projecting amount $d_2$ by which the pickling solution projects into the flow dividing portion 8 in the direction perpendicular to the flow direction of pickling solution (to the left and right in FIG. 9) is set to be as small as possible. As a result, lingering of pickling solution in the flow dividing portion 8 is suppressed, and clogging by the pickling solution can be prevented with certainty. Accordingly, in this mode of carrying out the invention, the purge pipe 9 of the first mode of carrying out the invention is not provided.

In the above description of each mode of carrying out the invention, the case was described, by way of example, in which the pickling solution is hydrochloric acid. However, the present invention is not limited to such a mode. This invention can employ equally as well other pickling solutions such as sulfuric acid. Also, this invention can be applied not only to ordinary steel strip but also to stainless steel strip, alloy steel strip, and various metal alloy strips. Furthermore, the present invention can be applied not only to steel strip but also to other steel stock such as wire or rod.

In the description of each mode of carrying out the invention, the case was described, by way of example, in which the steel strip being pickled is a hot rolled steel strip. However, the present invention is not limited to such a mode. The present invention can be applied equally as well to cold rolled steel strip, etc.

In the description of each mode of carrying out the invention, the case was described, by way of example, in which the flow path is a circulation flow path which circulates through an acid concentration continuous measuring apparatus of this invention and a pickling tank. However, the present invention is not restricted to such a mode. A flow path in the present invention may be any flow path which continuously flows through pickling tanks containing pickling solution. For example, it may also be a flow path connected between a pickling tank and an acid-containing tank such as a waste acid tank or a circulation tank, and pickling solution in a pickling tank may be made to continuously flow to the acid tank.

Furthermore, in the description of each mode of carrying out the invention, the case was described, by way of example, in which acid solution is supplied to the final pickling tank. However, the present invention is not limited to such a mode. The present invention can be equally as well applied to the case in which acid solution is supplied to a pickling tank other than the final pickling tank.

BEST MODE FOR CARRYING OUT THE INVENTION

The present invention will be described in further detail while referring to the following examples.

EXAMPLE 1

Acid concentration continuous measuring apparatuses $1a$–$1d$ like that shown in FIG. 1 were installed on each pickling tank $11a$–$11d$ of the continuous pickling line 12 shown in FIG. 3. The measured values output from the acid concentration continuous measuring apparatuses $1a$–$1d$ were converted to a hydrochloric acid concentration and an iron chloride concentration by the calculator 14, and feedback control and feed forward control of the supply of acid solution (hydrochloric acid) was performed by signals from the DDC apparatus 19. In this manner, the acid concentration of the pickling solution contained in the final pickling tank $11d$ of the continuous pickling line 12 was controlled.

Namely, feedback control based on the calculated value of acid concentration of pickling solution in the final pickling tank $11d$ was combined with feed forward control based on the thickness and width of the steel strip being pickled, the line speed, and the percent change in the acid concentration of the pickling solution contained in each of pickling tanks $11a$–$11c$, and the supply of acid solution to the final pickling tank $11d$ was automatically controlled.

As shown in FIG. 1, in this example as well, the acid concentration continuous measuring apparatuses $1a$–$1d$ contained commercially available density sensors $4a$–$4d$, temperature sensors $5a$–$5d$, and conductivity sensors $6a$–$6d$. With these, the density, the temperature, and the conductivity of the pickling solution flowing through the circulation flow paths $2a$–$2d$ were measured substantially continuously.

In this example, the results of measurement by each sensor were continuously output by the calculator 20 using the correlation formulas (calibration curves) for hydrochloric acid concentration and iron chloride concentration shown in FIGS. 5(a) and 5(b).

As shown in FIG. 4, the acid concentration continuous measuring apparatuses $1a$–$1d$ were installed in the vicinity of the side walls of the pickling tanks $11a$–$11d$. By having the pumps $13a$–$13d$ cause the pickling solution to continuously flow in one direction at a speed of 1 m/sec, clogging of the piping was prevented. Furthermore, as shown in FIG. 2, purge pipes $9a$–$9d$ were installed in flow dividing portions $8a$–$8d$ leading to the density sensors $4a$–$4d$, so the flow dividing portions $8a$–$8d$ which are easily clogged were periodically cleaned.

Furthermore, as shown in FIG. 4, the acid concentration continuous measuring apparatuses $1a$–$1d$ were installed in the vicinity of the side walls of the pickling tanks $11a$–$11d$ and pickling solution was made to flow in one direction. As a result, clogging of pickling solution within the pipes was prevented. In addition, the structure of piping was made as simple as possible in consideration of ease of cleaning and ease of maintenance. In this example, as shown in FIGS. 3 and 4, in order to prevent clogging, a filtering apparatus was not installed in any of the piping.

A comparison was made in the change in acid concentration over time in the final pickling tank between the case using acid concentration automatic control apparatus 10 (this example) and a case in which acid was supplied manually (conventional example). The results for this example are graphed in FIG. 10(a), and the results for the conventional example are graphed in FIG. 10(b). The triangles in FIGS. 10(a) and 10(b) show the timing at which acid solution was supplied to the final pickling tank $11d$.

According to this example, based on the substantially continuous measurement of acid concentration, acid solution can be supplied continuously in an analog manner. As a result, excess supply of acid solution was prevented, and failure for treatment to be performed due to insufficient supply of acid solution could be completely prevented. As a result, the acid concentration D of pickling solution in each pickling tank could be brought closer to a desired setting, and dispersion of the concentration could be suppressed as much as possible.

At point A in FIGS. 10(a) and 10(b), the speed of movement of the steel strip was increased from a low speed to a high speed. However, in the present example, since feed forward control of the final tank $11d$ was also carried out, an abrupt variation in the acid concentration D accompanying the increase in the speed of the strip was suppressed as much as possible.

In contrast, in the conventional example, the acid concentration D could only be measured once approximately every 15 minutes. As a result, a control lag developed, and the amount of acid solution which was used was extremely large. In addition, responsiveness of control to an increase in the speed of the steel strip was poor, and the acid concentration D could not be controlled with high accuracy.

Furthermore, in the conventional example, the dispersion of the acid concentration D was large, so it was necessary to make the minimum acid concentration D a control standard (the dashed line in FIGS. 10(a) and 10(b)). As a result, there was much wastage of the amount of acid solution which was used. In contrast, in the example of this invention, the dispersion of the acid concentration D could be suppressed to a low value, so the amount of acid solution employed was greatly decreased.

Figure 11:
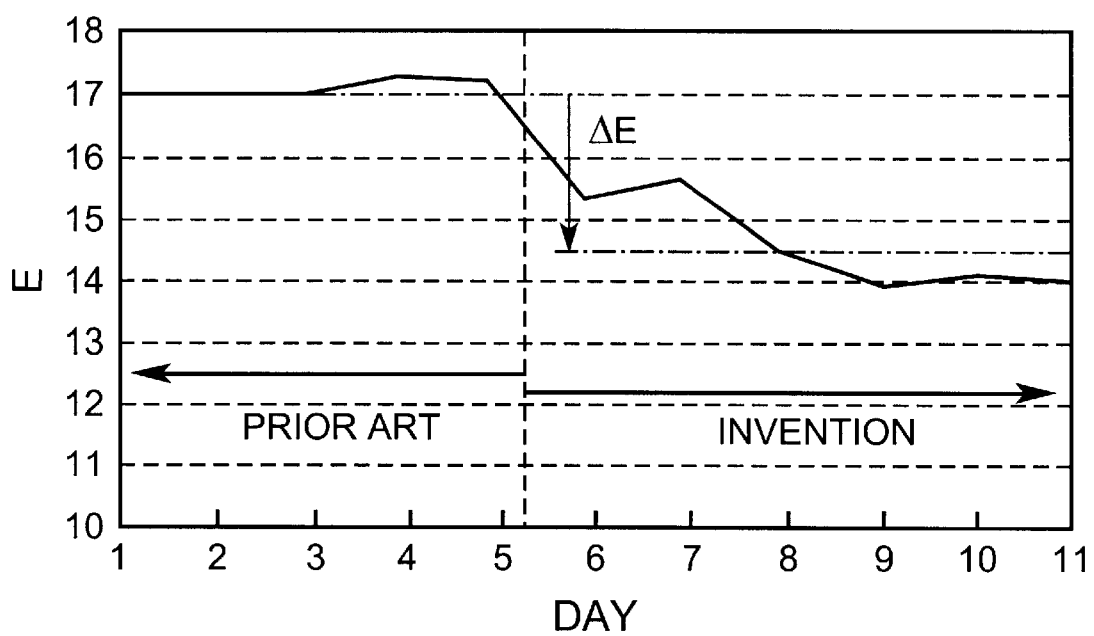
FIG. 11 is a graph showing acid consumption E per unit of output for an example of the present invention and for a conventional example, respectively.

FIG. 11 is a graph showing the acid consumption E per unit of output for this example and the conventional example. As can be seen from the graph in FIG. 11, according to this example, an improvement in units of acid consumption $\Delta E$ per unit of output of approximately 2.5 units with respect to the conventional example could be obtained.

EXAMPLE 2

Using the continuous pickling line 21 shown in FIG. 7(a) of the type in which pickling solution contained in a pickling tank on a downstream side is made to successively overflow to adjoining pickling tanks on an upstream side, the variation in the hydrochloric acid concentration F in each pickling tank was measured for the case in which acid concentration was measured and feedback control was performed using the acid concentration automatic control apparatus 22 shown in FIGS. 7 and 8 of the fourth and fifth inventions, and for the case in which acid concentration was measured by manually removing a sample from a pickling tank and using a reagent and feedback control was performed. Measurement of the hydrochloric acid concentration F in each pickling tank was carried out using the acid concentration continuous measuring apparatus of the first invention.

Figure 12A:
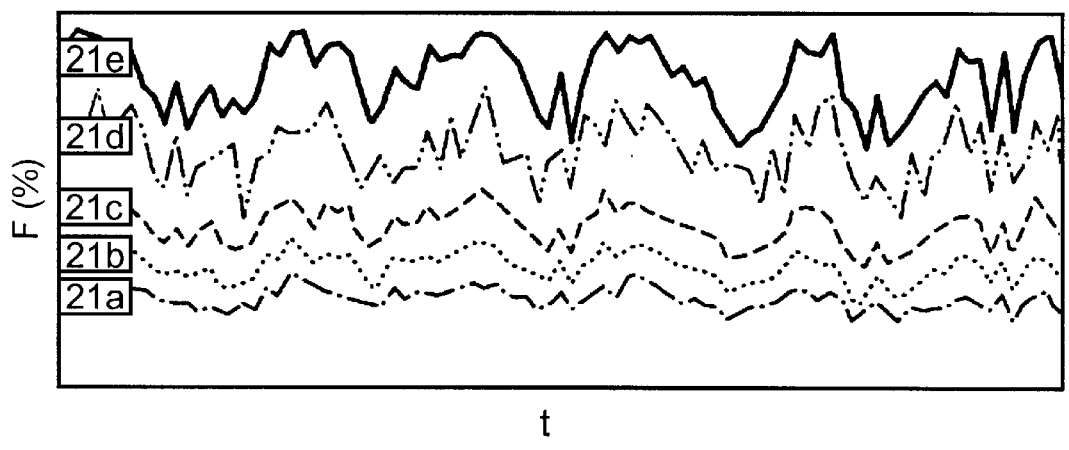
FIGS. 12(a), (b) show graphs of measurement results for a second example, FIG. 12(a) showing the case in which the acid concentration F in a fifth tank 21e was measured manually, FIG. 12(b) showing the case in which feedback control was carried out based on the measured value of acid concentration in the fifth tank 21e, and FIG. 12(c) showing the case in which feedback control was carried out based on the measured values of acid concentration in the fifth tank 21e and a fourth tank 21d.
Figure 12B:
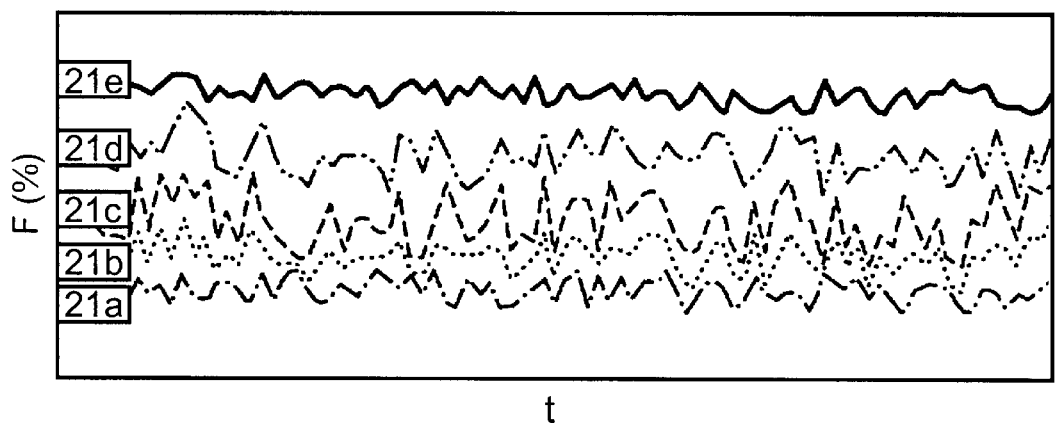
Figure 12C:
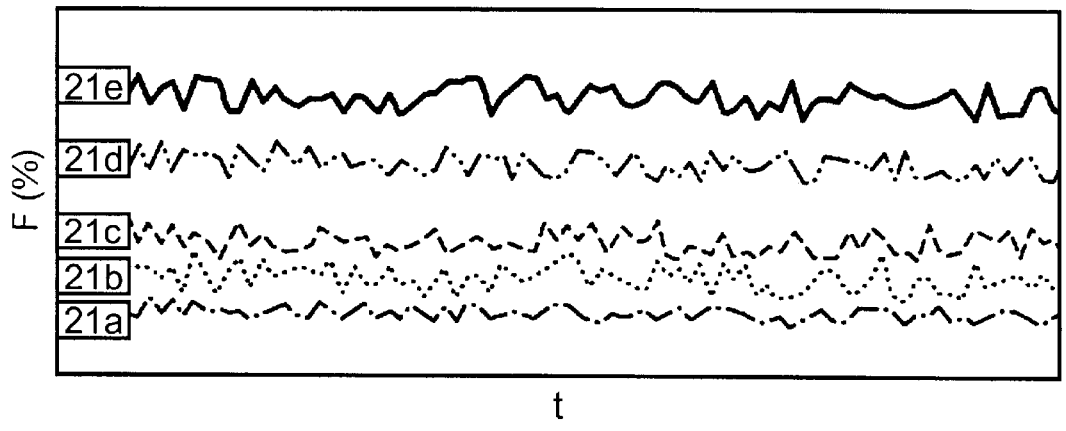

The results of measurements are graphed in FIG. 12. FIG. 12(a) shows the case in which the acid concentration F of the fifth tank 21e was measured by hand, FIG. 12(b) shows the case in which feedback control was performed based on a continuously measured value of the acid concentration F in the fifth tank 21e and FIG. 12(c) shows the case in which feedback control was performed based on continuously measured values of the acid concentration F in the fifth tank 21e and the fourth tank 21d.

As shown in FIG. 12(a), when the acid concentration F was measured manually, the acid concentration F in each of pickling tanks 21a–21e varied greatly, and it was difficult to control it to a constant value. Furthermore, the overall acid concentration F was on the high side.

As shown in FIG. 12(b), when feedback control based on continuously measured values of the acid concentration F in the fifth tank 21e was performed, the acid concentration F in the fifth tank 21e was controlled, so the acid concentration F in the fifth tank 21e is stabilized, and the overall acid concentration somewhat decreased. However, the acid concentrations F in pickling tanks 21d–21a starting with the fourth tank 21d still greatly varied.

As shown in FIG. 12(c), when feedback control based on the continuously measured values of the acid concentrations F in the fifth tank 21e and the fourth tank 21d was performed, the acid concentrations F not only in the fifth tank 21e and the fourth tank 21d but also in the other pickling tanks 21c–21a were stabilized, and the overall acid concentration also decreased.

Industrial Applicability

According to an acid concentration measuring apparatus of the first invention or an acid concentration measuring method of the second invention, the density, the temperature, and the conductivity of pickling solution can be measured substantially continuously. As a result, the acid concentration can be measured over long periods of time. In addition, as a structure is employed in which pickling solution does not clog within a flow path for pickling solution, the ease of maintenance is increased. Therefore, according to an acid concentration measuring apparatus of this invention, it is possible to continuously perform measurements over long periods of time.

Furthermore, according to an acid concentration automatic control apparatus of the third invention–fifth invention using this acid concentration measuring apparatus, the acid concentration of pickling solution in a pickling tank to which acid solution is supplied can be controlled with high accuracy and stably. As a result, acid consumption per unit of output is improved.

In particular, according to an acid concentration automatic control apparatus of the fifth invention, feedback control is combined with continuous measurement of acid concentration, and these are further combined with feed forward control. As a result, according to the acid concentration continuous control apparatus of the fifth invention, the accuracy of control and the responsiveness can both be enormously increased.

In addition, according to the acid concentration automatic control apparatuses of the third invention–fifth invention, using an acid concentration measuring apparatus of the first invention, the acid concentration of the pickling solution in pickling tanks in a continuous pickling line of the type in which pickling solution in a pickling tank on a downstream side is made to successively overflow to adjoining pickling tanks on an upstream side is measured, and the measured result is fed back to the supply of acid solution. As a result, the acid concentration of pickling solution in each of the pickling tanks can be maintained at a suitable level, and the consumption of pickling solution per unit of output can be decreased.

What is claimed is:

1. An acid concentration controlling system comprising
(i) an acid concentration measuring apparatus comprising:
a body which is installed on a portion of a flow path of pickling solution which is taken from a pickling tank, the flow path being connected to the pickling tank,
a density sensor which measures the density of the pickling solution flowing within the body,
a temperature sensor which measures the temperature of the pickling solution in the flow path or the pickling tank,
a conductivity sensor which measures the conductivity of the pickling solution in the flow path or the pickling tank, and
a calculating apparatus which calculates the acid concentration of the pickling solution flowing through the portion of the flow path, based on the measurements by the density sensor, the temperature sensor, and the conductivity sensor, and
(ii) a feedback control means which adjusts the acid concentration of the pickling solution in the pickling tank to which the acid solution is supplied based on a calculated value of the acid concentration obtained by the acid concentration measuring apparatus.

2. An acid concentration controlling system as claimed in claim 1, wherein the temperature sensor and/or the conductivity sensor is installed in the body of the acid concentration measuring apparatus.

3. An acid concentration controlling method comprising:
measuring the density of pickling solution continuously flowing within the interior of an acid concentration measuring apparatus body, which is installed in a portion of a flow path of pickling solution taken from a pickling tank, the flow path being connected to the pickling tank,
measuring the temperature and the conductivity of the pickling solution in the flow path or the pickling tank,
calculating the acid concentration of the pickling solution flowing in the portion of the flow path, based on the results of measurement of the density, the temperature, and the conductivity, and
adjusting the acid concentration of the pickling solution in the pickling tank to which the acid solution is supplied by performing feedback control or a combination of feedback control and feed forward control based on a calculated value of the acid concentration obtained from the acid concentration measuring apparatus.

4. A method as claimed in claim 3, wherein the flow speed of the pickling solution flowing through the body is 2 m/sec or less.

5. A continuous pickling line comprising:
a plurality of pickling tanks forming a continuous pickling line, wherein an acid concentration measuring apparatus is installed on a pickling tank to which acid solution is supplied, and
a feedback control means which adjusts the acid concentration of pickling solution in the pickling tank to which the acid solution is supplied based on a calculated value of the acid concentration obtained by the acid concentration measuring apparatus,
wherein the acid concentration measuring apparatus comprises:

a body which is installed on a portion of a flow path of the pickling solution which is taken from the pickling tank, the flow path being connected to the pickling tank, a density sensor which measures the density of the pickling solution flowing within the body, a temperature sensor which measures the temperature of the pickling solution in the flow path or the pickling tank, a conductivity sensor which measures the conductivity of the pickling solution in the flow path or the pickling tank, and a calculating apparatus which calculates the acid concentration of the pickling solution flowing through the portion of the flow path, based on the measurements by the density sensor, the temperature sensor, and the conductivity sensor.

6. A continuous pickling line as claimed in claim 5, further comprising a feed forward control apparatus which controls the acid concentration of pickling solution in the pickling tank to which the acid solution is supplied based on a calculated value of the acid concentration obtained from the acid concentration measuring apparatus.

7. A continuous pickling line as claimed in claim 5, wherein the pickling tank to which acid solution is supplied is a final pickling tank.

8. A continuous pickling line as claimed in claim 5, wherein the continuous pickling line is a continuous pickling line of the type in which pickling solution in a pickling tank on a downstream side is made to successively overflow to adjoining pickling tanks on an upstream side.

9. A continuous pickling line comprising:

a plurality of pickling tanks forming a continuous pickling line, wherein an acid concentration measuring apparatus is installed on at least one pickling tank other than the pickling tank to which the acid solution is supplied, and a feedback control means which controls the acid concentration of pickling solution in the pickling tank to which the acid solution is supplied based on calculated values of the acid concentration obtained by a plurality of the acid concentration measuring apparatus, wherein the acid concentration measuring apparatus comprises:

a body which is installed on a portion of a flow path of the pickling solution which is taken from the pickling tank, the flow path being connected to the pickling tank, a density sensor which measures the density of the pickling solution flowing within the body, a temperature sensor which measures the temperature of the pickling solution in the flow path or the pickling tank, a conductivity sensor which measures the conductivity of the pickling solution in the flow path or the pickling tank, and a calculating apparatus which calculates the acid concentration of the pickling solution flowing through the portion of the flow path, based on the measurements by the density sensor, the temperature sensor, and the conductivity sensor.

10. An acid concentration automatic control method comprising:

installing an acid concentration measuring apparatus on at least a pickling tank to which acid solution is supplied out of a plurality of pickling tanks forming a continuous pickling line, and adjusting the acid concentration of pickling solution in the pickling tank to which the acid solution is supplied by performing feedback control or a combination of feedback control and feed forward control based on a calculated value of the acid concentration obtained from the acid concentration measuring apparatus, wherein the acid concentration measuring apparatus comprises:

a body which is installed on a portion of a flow path of the pickling solution which is taken from the pickling tank, the flow path being connected to the pickling tank, a density sensor which measures the density of the pickling solution flowing within the body, a temperature sensor which measures the temperature of the pickling solution in the flow path or the pickling tank, a conductivity sensor which measures the conductivity of the pickling solution in the flow path or the pickling tank, and a calculating apparatus which calculates the acid concentration of the pickling solution flowing through the portion of the flow path, based on the measurements by the density sensor, the temperature sensor, and the conductivity sensor.

11. An acid concentration controlling system comprising (i) an acid concentration measuring apparatus comprising:

a body which is cylindrical in shape and through which a pickling solution taken from a pickling tank flows continuously, a density sensor which is installed in the body and which measures the density of the pickling solution flowing within the body, a temperature sensor which is installed in the body and which measures the temperature of the pickling solution flowing within the body, a conductivity sensor which is installed in the body and which measures the conductivity of the pickling solution flowing within the body, a calculating apparatus which is connected to the density sensor, the temperature sensor, and the conductivity sensor, which calculates the acid concentration of the pickling solution based on the measurements by the density sensor, the temperature sensor, and the conductivity sensor, and (ii) a feedback control means which adjusts the acid concentration of the pickling solution in the pickling tank to which the acid solution is supplied based on a calculated value of the acid concentration obtained by the acid concentration measuring apparatus.

12. An acid concentration controlling system as claimed in claim 11, wherein the body of the acid concentration measuring apparatus is substantially straight.

13. An acid concentration controlling system comprising (i) an acid measuring apparatus comprising:

a circulation flow path through which a pickling solution flows from a pickling tank and returns to the pickling tank;

a body which is cylindrical in shape, which is installed in the circulation flow path to form a part of the circulation flow path, a density sensor which is installed in the body, a temperature sensor which is installed in the body, or in the circulation flow path, or in the pickling tank, a conductivity sensor which is installed in the body, or in the circulation flow path, or in the pickling tank, a calculating apparatus which is connected to the density sensor, the temperature sensor, and the conductivity sensor, which calculates the acid concentration of the pickling solution based on the measurements by the density sensor, the temperature sensor, and the conductivity sensor, and (ii) a feedback control means which adjusts the acid concentration of the pickling solution in the pickling tank to which the acid solution is supplied based on a calculated value of the acid concentration obtained by the acid concentration measuring apparatus.

14. An acid concentration controlling system as claimed in claim 13, further comprising:

a pump which takes the pickling solution from the pickling tank to continuously flow the pickling solution through the circulating flow path.

15. An acid concentration controlling system as claimed in claim 13, wherein the temperature sensor and the conductivity sensor are connected to the body of the acid concentration measuring apparatus.

16. An acid concentration controlling system as claimed in claim 13, wherein the body of the acid concentration measuring apparatus is substantially straight.

17. An acid concentration controlling system as claimed in claim 13, further comprising a flow speed controller for controlling the flow speed of the pickling solution flowing through the body at a flow speed of 2 m/sec or less.

18. An acid concentration controlling system comprising
(i) an acid concentration measuring apparatus comprising;

a means of circulating a pickling solution through a circulation flow path to take the pickling solution from a pickling tank and to return it to the pickling tank;

a density sensor which is installed in said means and which measures the density of the pickling solution flowing within the circulation flow path, a temperature sensor which is installed in said means and which measures the temperature of the pickling solution flowing within the circulation flow path, a conductivity sensor which is installed in said means and which measures the conductivity of the pickling solution flowing within the circulation flow path, a calculating apparatus which is connected to the density sensor, the temperature sensor, and the conductivity sensor, which calculates the acid concentration of the pickling solution based on the measurements by the density sensor, the temperature sensor, and the conductivity sensor, and (ii) a feedback control means which adjusts the acid concentration of the pickling solution in the pickling tank to which the acid solution is supplied based on a calculated value of the acid concentration obtained by the acid concentration measuring apparatus.

19. An acid concentration controlling system comprising
(i) an acid concentration measuring apparatus comprising:

a circulation flow path through which a pickling solution is taken from a pickling tank and returned to the pickling tank, a density sensor which is installed in said circulation flow path which measures the density of the pickling solution flowing within the circulation flow path, a temperature sensor which measures the temperature of the pickling solution, a conductivity sensor which measures the conductivity of the pickling solution, a calculating apparatus which calculates the acid concentration of the pickling solution flowing through the portion of the flow path based on the measurements by the density sensor, the temperature sensor, and the conductivity sensor, and (ii) a feedback control means which adjusts the acid concentration of the pickling solution in the pickling tank to which the acid solution is supplied based on a calculated value of the acid concentration obtained by the acid concentration measuring apparatus.

20. An acid concentration controlling system as claimed in claim 19, further comprising:

a pump which takes the pickling solution from the pickling tank to continuously flow the pickling solution through the circulating flow path.

21. An acid concentration controlling system as claimed in claim 19, further comprising a flow speed controller for controlling the flow speed of the pickling solution flowing through the body at a flow speed of 2 m/sec or less.

* * * * *